(12) United States Patent
Iida et al.

(10) Patent No.: US 6,769,501 B2
(45) Date of Patent: Aug. 3, 2004

(54) WALK BEHIND WORKING MACHINE

(75) Inventors: Tetsuo Iida, Wako (JP); Tomoaki Ishikawa, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/033,969

(22) Filed: Dec. 20, 2001

(65) Prior Publication Data

US 2003/0006073 A1 Jan. 9, 2003

(30) Foreign Application Priority Data

Dec. 28, 2000 (JP) .................................... 2000-403381
Jul. 24, 2001 (JP) .................................... 2001-223318

(51) Int. Cl.⁷ .............................................. B62D 51/04
(52) U.S. Cl. ................... 180/19.3; 180/19.2; 180/19.1; 180/315
(58) Field of Search .............................. 180/19.3, 336, 180/383, 315, 333, 19.1, 19.2; 477/70, 79, 86, 166; 192/362, 99 R, 99 A, 99 B; 74/469; 56/10.5, 11.3, 11.8

(56) References Cited

U.S. PATENT DOCUMENTS

| | | | | |
|---|---|---|---|---|
| 3,613,814 A | * | 10/1971 | Prien ............................. | 180/9 |
| 4,132,280 A | * | 1/1979 | Jones et al. ................. | 180/19.3 |
| 4,493,180 A | * | 1/1985 | Wick ............................ | 56/11.3 |
| 4,538,401 A | * | 9/1985 | Takamizawa et al. ........ | 56/11.8 |
| 4,858,739 A | | 8/1989 | Nemoto ..................... | 192/18 R |
| 5,146,735 A | * | 9/1992 | McDonner ................... | 56/11.3 |
| 5,251,711 A | | 10/1993 | Meyer et al. .............. | 180/19.1 |
| 5,316,097 A | * | 5/1994 | Meyer et al. .............. | 180/19.1 |
| 5,355,662 A | | 10/1994 | Schmidt ...................... | 56/11.3 |
| 5,375,674 A | * | 12/1994 | Peter .......................... | 180/19.3 |
| 5,701,967 A | * | 12/1997 | Barnard ..................... | 180/19.3 |
| 5,735,064 A | * | 4/1998 | Holl ............................ | 37/260 |
| 6,105,348 A | * | 8/2000 | Turk et al. .................. | 56/10.5 |
| 2002/0153179 A1 | * | 10/2002 | Kobayashi et al. ........ | 180/19.3 |

FOREIGN PATENT DOCUMENTS

| | | |
|---|---|---|
| EP | 0789989 | 8/1997 |
| JP | 58032578 | 7/1979 |

OTHER PUBLICATIONS

Patent Abstracts of Japan, vol. 010, No. 062 (M–460), Mar. 12, 1986, publication No. 60–209331, publication date Oct. 21, 1985.

* cited by examiner

Primary Examiner—Lesley D. Morris
Assistant Examiner—Daniel Yeagley
(74) Attorney, Agent, or Firm—Adams & Wilks

(57) ABSTRACT

A walk behind working machine has a frame having a forward end portion and a rear end portion, a prime mover mounted on the frame, a pair of drive wheels mounted on the frame for undergoing rotation, and a power transmission mechanism for transmitting rotational power from the prime mover to the drive wheels. A running clutch is adapted to be placed in an engaged state in which rotational power is transmitted to the drive wheels and in a disengaged state in which rotational power is not transmitted to the drive wheels. A pair of operating handles extend from the rear end portion of the frame. A single grip/clutch lever serves as a grip handle for being gripped by an operator to maneuver the working machine and as a clutch lever manually operable to selectively place the running clutch in the engaged state and the disengaged state. The grip/clutch lever is pivotally mounted on distal end portions of the operating handles to undergo pivotal movement in forward and rearward directions of the frame between a rearward stop position having a first forward tilt and in which the running clutch is in the disengaged state and a forward operating position having a second forward position greater than the first forward position and in which the running clutch is in the engaged state.

18 Claims, 22 Drawing Sheets

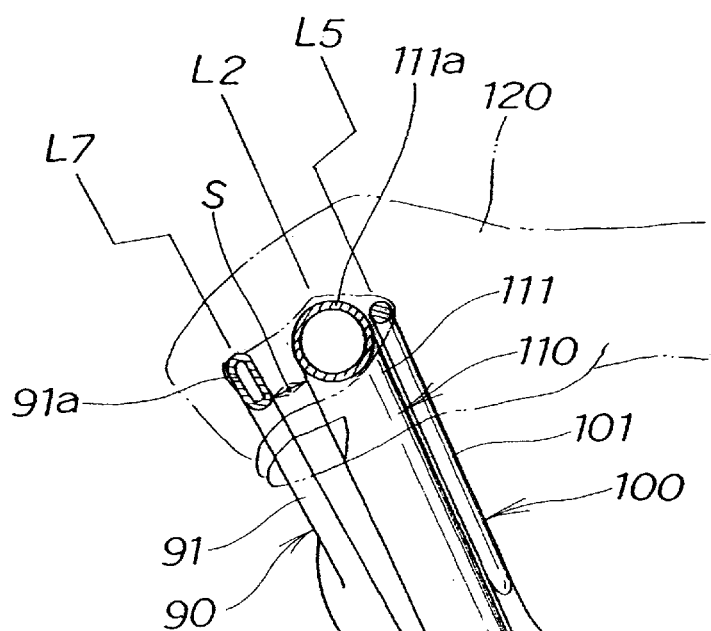
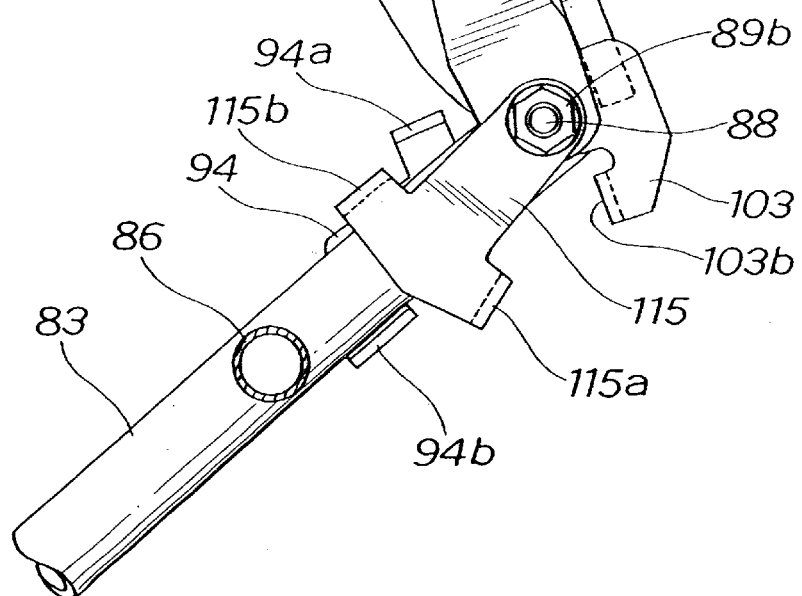
FIG. 21

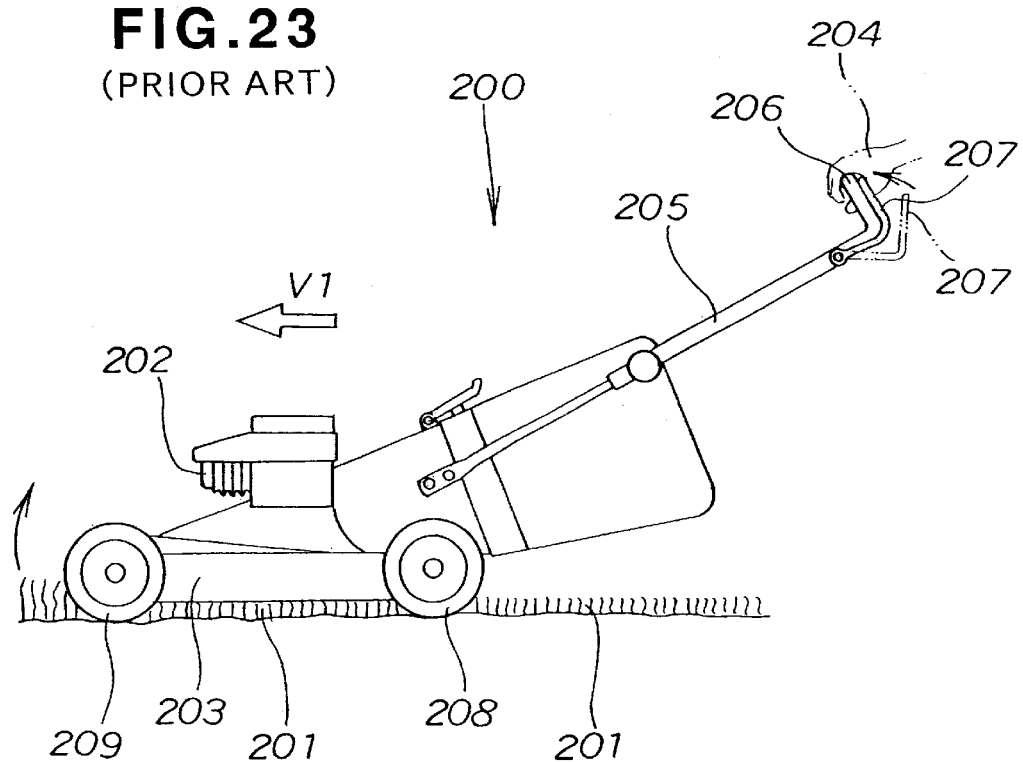

WALK BEHIND WORKING MACHINE

FIELD OF THE INVENTION

The present invention relates to a walk behind working machine operated by an operator walking behind the machine and gripping a grip portion of a handle of the machine.

BACKGROUND OF THE INVENTION

One example of walk behind working machines is known from, for example, Japanese Utility Model Publication No. SHO-58-32578 entitled "A SELF-PROPELLED LAWN-MOWER". The known lawnmower is described below with reference to FIG. 23 hereof.

When cutting a lawn 201 with the walk behind lawn-mower 200, an operator 204 shifts a clutch lever 207 in a direction as shown by an arrow from a position, shown in a phantom line, while gripping a grip 206 of a handle 205 under a condition where a cutter in a housing 203 is rotated by an engine 202. With such an operation, a running clutch, interposed between the engine 202 and rear wheels 208, is coupled to enable drive power of the engine 202 to be delivered to the rear wheels 208. Rendering the lawnmower 200 to be self-propelled with the rear wheels 208 and front wheels 209 allows the cutter to cut the lawn 201.

Normally, the running clutch used in the lawnmower employs a dog-clutch. The dog-clutch is arranged such that sliding a shifter in a case toward a worm gear causes clutch teeth of the shifter to be brought into mating engagement with worm teeth of the worm gear to assume a coupled state. Such a dog-clutch is instantaneously operated from an uncoupled state to the coupled state. For this reason, when the operator 204 shifts the clutch lever 207 in the direction as shown by the arrow from teh position shown by the phantom line while gripping the grip 206 of the handle 205, the clutch is apt to be instantaneously brought into the coupled state to cause the lawnmower 200 to rapidly start off at an initial speed V1. When this occurs, since the operator 204 holds the grip 206, rapid taking off of the lawnmower 200 causes the operator 204 to be pulled from the lawn-mower 200. Therefore, in order to have the walk behind lawnmower 200 to start off smoothly, the operator must start walking in synchronism with the coupling operation of the clutch.

However, if the operator 204 begins to walk at a low speed, a forward movement of the lawnmower 200 is interrupted, causing the rear wheels 208 of the lawnmower 200 to slip or causing the front wheels 209 to lift up as shown by the arrow. As a result, there are some instances where the grass 201 is caused to be laid down or to be torn off and where the cutter tends to be lifted up due to lifting up of the front wheels 209. Thus, it is difficult to cut the grass 201 with a high quality finish using the walk behind lawn-mower during the taking off period of the walk behind lawnmower 200.

Because of the reasons described above, in order to allow the walk behind lawnmower 200 to start off in a suitable manner, it is required for the operator to predict the speed at which the lawnmower takes off, thereby requiring skilled handling of the walk behind lawnmower 200 in order to cut the grass 201 with a desired finish. For this reason, an attempt has heretofore been made with a view to providing a walk behind lawnmower, which is enabled to carry out a smooth taking off, into practical use.

SUMMARY OF THE INVENTION

It is therefore an object of the present invention to provide a walk behind working machine which has excellent operability during a take-off operation to achieve a desired smooth take-off.

According to a first aspect of the present invention, there is provided a walk behind working machine which comprises: a machine body; a drive source mounted on the machine body; right and left drive wheels carried on a rear portion of the machine body and driven by actuation of the drive source; a running clutch provided between the right and left drive wheels and coupled to the drive source such that it allows use in a slipping phase; operating handles extending rearward from the machine body; and a grip/clutch lever mounted on the handles swingably between a forward position and a rearward position, the grip/clutch lever being connected to the running clutch via a clutch cable such that the running clutch is coupled when the grip/clutch lever is shifted to the forward position, and is uncoupled when the grip/clutch lever is shifted to the rearward position, whereby the working machine is capable of traveling in the clutch slipping phase during the course of shift of the grip/clutch lever between the forward and rearward positions.

By thus bringing the grip/clutch lever into a clutch slipping phase during its forward pushing, the walk behind working machine starts running at a low speed. In this instance, since the operator merely walks forward while applying the forward pushing force onto the grip/clutch lever, it is possible for the operator to handle the walk behind working machine in a natural motion, making it possible to have the walk behind working machine start off smoothly. For this reason, it is possible to cut grass with the walk behind working machine in a high quality finish from the start of work.

In addition, the walk behind working machine may start off at a low speed during the operator's forward pushing operation of the grip/clutch lever, allowing the operator to follow the start-off movement of the walk behind working machine in a natural motion.

Further, since the grip/clutch lever serves as both a clutch lever and a handle grip as a result of it being rendered capable of handling the machine body by gripping the grip/clutch lever, it is possible to perform a clutch operation with the grip/clutch lever gripped. Accordingly, it is possible to save troublesome steps for removing one hand from the handle grip with the clutch lever handled with the removed hand as required in the conventional working machine, with a resultant decrease in the operator's load.

In a preferred form, the grip/clutch lever includes stoppers mounted to proximal ends thereof for restricting fore and aft movements of the grip/clutch lever beyond the forward and rearward positions. The stoppers are thus separated from the grip of the grip/clutch lever during a handling operation of the grip/clutch lever, thereby avoiding interference of the operator's hand with the stoppers.

Desirably, the grip/clutch lever further includes a hold lever mounted to the handles forwardly of the grip/clutch lever so that by gripping the grip/clutch lever and the hold lever together as the grip/clutch lever is tilted or swung toward the hold lever until it comes to the forward position, the grip/clutch lever is retained at the forward position. By thus tilting the grip/clutch lever to the forward position while gripping the grip/clutch lever together with the hold lever, the grip/clutch lever is retained at the forward position. Since the grip/clutch lever is retained at the forward position by merely gripping the grip/clutch lever together with the hold lever, it is possible for the grip/clutch lever to be retained at the forward position in a further simplified manner.

The hold lever is swingable between a forward stationary position and a rearward gripping position so that when the hold lever is gripped together with the grip/clutch lever at the forward position, the hold lever is retained at the gripping position and when the hold lever is released from the gripped state, it is returned to the stationary position. Thus, since the hold lever is arranged to have the capability of tilting between the forward stationary position and the rearward gripping position, gripping the hold lever and the grip/clutch lever together causes the hold lever to be retained at the gripping position for thereby allowing the grip/clutch lever to be retained at the forward position. On the other hand, there is an instance where it is desired for the hold lever to be kept at the forward position by continuously pushing the grip/clutch lever forward without gripping the hold lever. In such a case, since the hold lever is rendered capable of returning to the stationary position, it is possible for the operator's hand to be precluded from interfering with the hold lever during continuous forward pushing movement of the grip/clutch lever. Thus, the presence of the capability for tilting the hold lever enables the operation for retaining the grip/clutch lever at the forward position to be carried out in the two different modes. As a result, a suitable operating method can be selected from the two different modes in accordance with the working status of the walk behind working machine, with the result that the maneuverability or operability of the walk behind working machine is further improved.

With the stopper mounted to the proximal end of the hold lever for restricting the fore and aft movements of the hold lever at the stationary position and the gripping position, it becomes possible to separate the stopper from the grip of the hold lever to thereby prevent the operator's hand from interfering with the stopper during the handling operation of the hold lever.

According to a second aspect of the present invention, there is provided a walk behind working machine which comprises: a machine body; a drive source mounted on the machine body; right and left drive wheels carried on a rear portion of the machine body and driven by actuation of the drive source; a running clutch provided between the right and left drive wheels and coupled to the drive source such that it allows use in a slipping phase; operating handles extending rearward from the machine body; a grip/clutch lever mounted on the handles swingably between a forward position and a rearward position, the grip/clutch lever being connected to the running clutch via a clutch cable such that the running clutch is coupled when the grip/clutch lever is shifted to the forward position, and is uncoupled when the grip/clutch lever is shifted to the rearward position; and a hold lever mounted on the handles forwardly of the grip/clutch lever, the grip/clutch lever and the hold lever being spaced a predetermined distance from each other when the grip/clutch lever, after it is swung toward the hold lever until it comes to the forward position, is gripped together with the hold lever.

Thus, by swinging the grip/clutch lever to the forward position, the running clutch is brought into the slipping phase, thereby enabling the walk behind working machine to start off at a low speed. That is, the operator may advance forward while applying a pushing force to the grip/clutch lever. This allows the operator to handle the walk behind working machine in a natural motion, thereby enabling the walk behind working machine to start off in a smooth manner.

In addition, merely tilting the grip/clutch lever to the forward position compels the walk behind working machine to start off at a low speed. As a result, the operator is allowed to follow the start off operation of the walk behind working machine in a natural motion.

Further, by gripping the grip/clutch lever to allow the machine body to be handled, the grip/clutch lever may commonly serve as the clutch lever and the handle grip, permitting the clutch operation to be performed with the grip/clutch lever retained in the gripped state. Consequently, it is possible to save troublesome steps, which would be required in the conventional working machine, for removing one hand from the handle grip and for handling the clutch lever with the removed hand.

When the walk behind working machine ascends a sloped hill in an exemplary case, large drive power is required. When the walk behind working machine travels in a non-working state, it is desired that the working machine advances at a high speed. To this end, as described above, when the grip/clutch lever, remaining at the forward position, is gripped with the hold lever, the grip/clutch lever is so constructed as to be separated from the hold lever by a given distance. For this reason, strongly gripping the grip/clutch lever and the hold lever enables the grip/clutch lever to be strongly urged toward the hold lever. With such an action, a strong urging force can be applied to the running clutch, thereby enabling the slipping phase to be adjusted into a less slipping state. Therefore, the drive power of the walk behind working machine is increased depending on the working status while allowing the working machine to travel at a higher speed.

BRIEF DESCRIPTION OF THE DRAWINGS

Certain preferred embodiments of the present invention will be described in detail below, by way of example only, with reference to the accompanying drawings, in which:

FIG. 21 is an operational view illustrating a condition wherein the hold lever is gripped from the condition of FIG. 20 with a given distance spaced from the grip/clutch lever;

FIG. 23 is a side view of a conventional walk behind working machine.

DETAILED DESCRIPTION OF THE PREFERRED EMBODIMENTS

Figure 1:
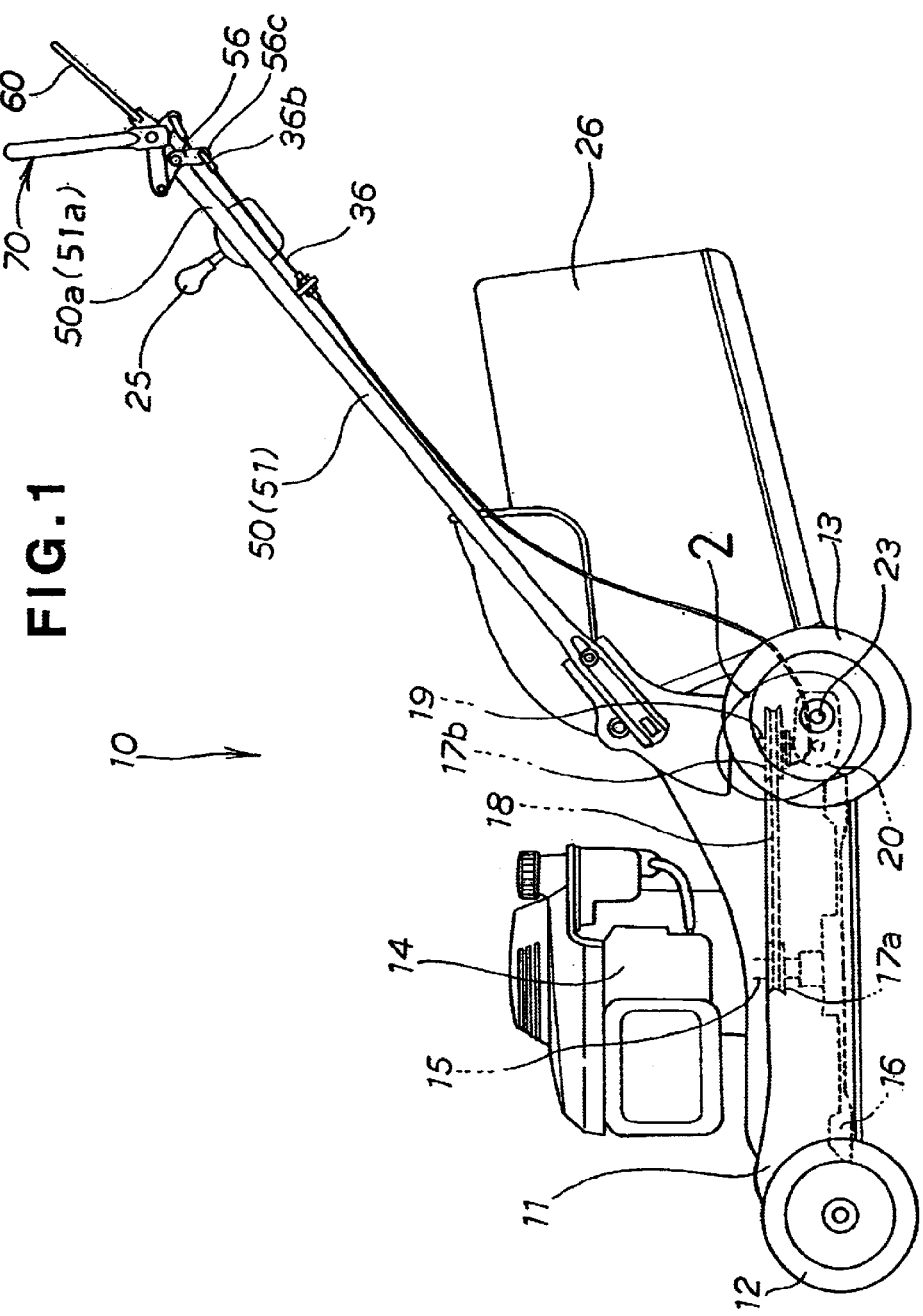
FIG. 1 is a side view of a walk behind working machine according to a first embodiment of the present invention.

FIGS. 1 to 10 show a walk behind working machine of a first preferred embodiment of the present invention. In FIG. 1, the walk behind working machine 10 includes a machine body 11 whose fore and aft distal ends have right and left front wheels 12 and right and left rear wheels (running wheels) 13 (with only one of the front wheels and one of the rear wheels being shown in a side view of FIG. 1). An engine (primer mover) 14 is fixedly mounted on an upper area of the machine body 11. The engine has an output shaft 15 having a lower distal end mounted with a cutter 16 via a clutch/brake (not shown). A drive pulley 17a, which delivers a drive power to the rear wheels 13, is fixedly mounted on an intermediate part of the output shaft 15. A belt 18 is wound between the drive pulley 17a an an input pulley 17b. Th rear wheels 13 are connected to an input shaft 19, which is mounted to the input pulley 17b, via a transmission 20.

In the walk behind lawnmower 10, operating the engine 14 allows the rear wheels 13 and the cutter 16 to rotate, permitting the front and rear wheels 12, 13 to travel while cutting a lawn with the cutter 16. When this takes place, an operator walks while following the walk behind lawnmower 10 and gripping a grip/clutch lever 70 and a brake lever 60.

The walk behind lawnmower 10 of the present invention is of the type which includes a running clutch 30 (see FIG. 2) which is mounted in a drive system (transmission 20) which interconnects the input shaft 19 to the rear wheels 13 and has right and left handles 50, 51 which extend rearward from a rear end portion of the machine body, with the grip/clutch lever 70 being carried with the right and left handles 50, 51 to allow the running clutch 30 to be coupled or uncoupled. The running clutch 30 is contained in the transmission 20.

Also, the walk behind lawnmower 10 includes a throttle control lever 25 mounted in the close proximity to a rear distal end portion 50a of the left handle 50 for controlling an engine speed, with the grip/clutch lever 70 and the brake lever 60 being carried with the rear distal end portions 50a, 51a of the right and left handles 50, 51 for tilting movement to control a clutch and a brake of the cutter. A lawn receiver box 26 receives the lawn cut by the cutter 16.

Figure 2:
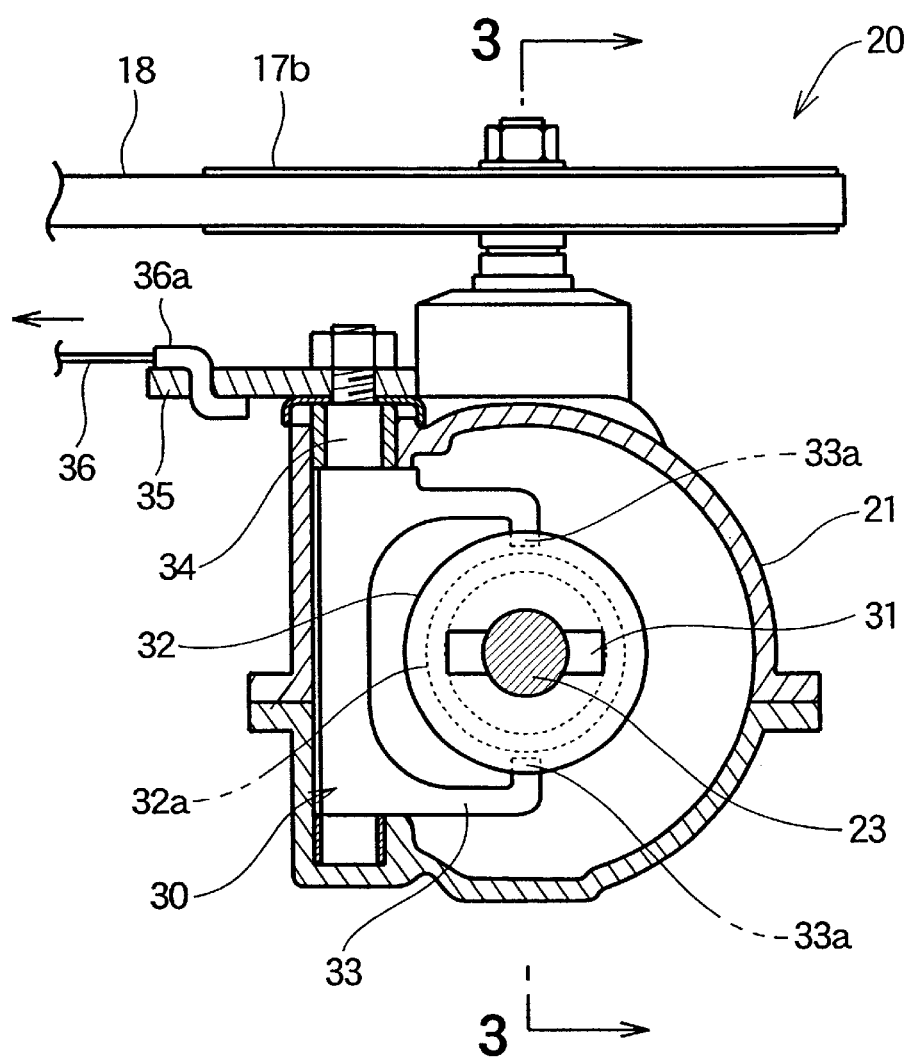
FIG. 2 is an enlarged cross-sectional view of a portion 2 shown in FIG. 1.
Figure 3:
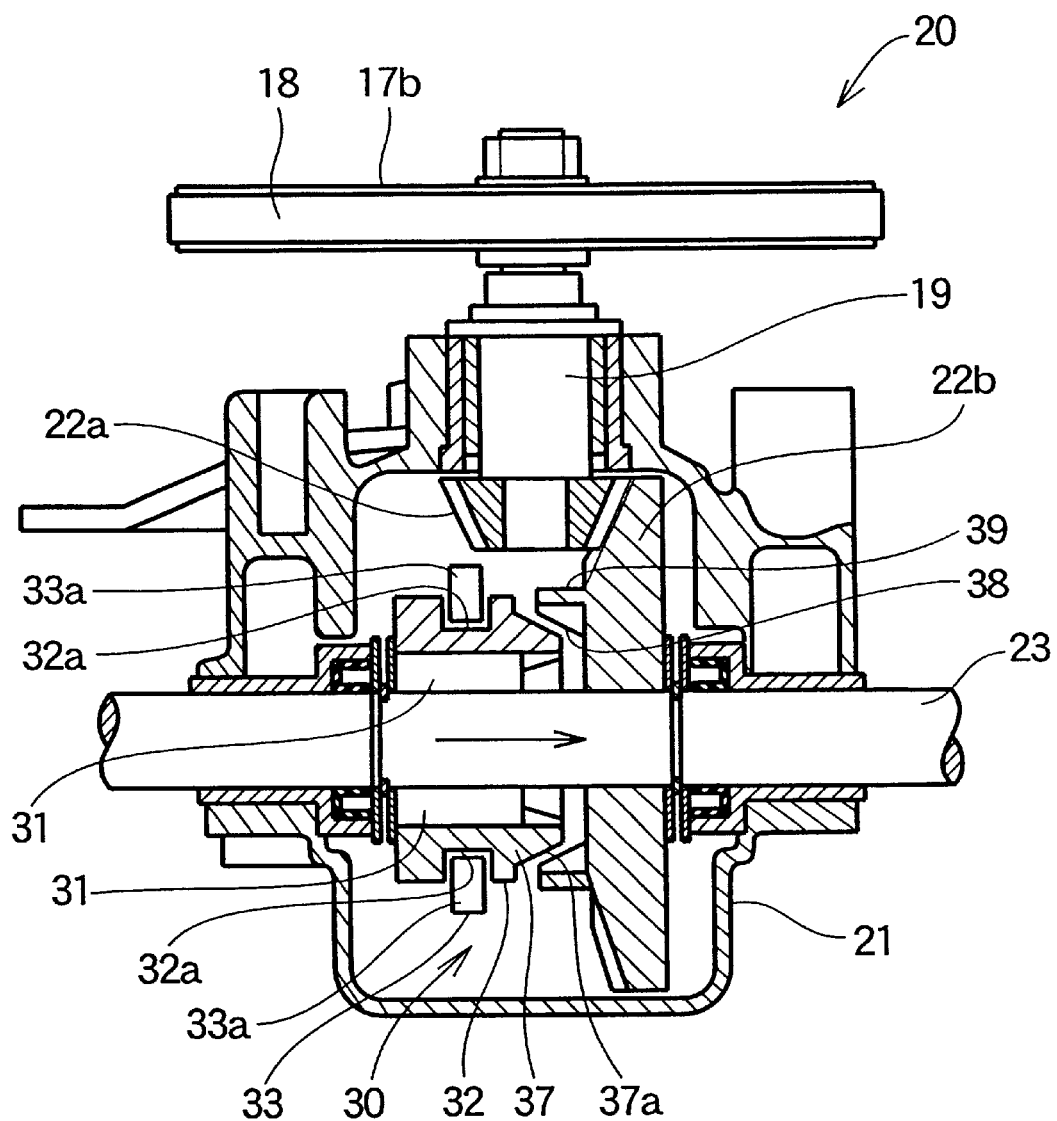
FIG. 3 is a cross-sectional view taken along line 3—3 of FIG. 2.

In FIGS. 2 and 3, the transmission 20 is comprised of a transmission case 21 by which the input shaft 19 is supported for rotational movement, with a pinion 22a formed at a distal end of the input shaft 19 being located in the transmission case 21 and held in meshing engagement with a bevel gear 22b, and a drive-wheel drive shaft 23 disposed in the transmission case 21 for rotational movement and associated with the running clutch 30.

The running clutch 30 includes a clutch shifter 32 slidably mounted on the rear-wheel drive shaft 23 via a pin 31 fixedly mounted to the drive shaft 23. An outer circumferential periphery of the clutch shifter 32 is formed with a recessed portion 32a in which claws 33a, 33a of a clutch cam 33 is operatively located. The clutch cam 33 is mounted in the transmission case 21 by means of a support pin 34 for tilting movement. A clutch lever 35 is coupled to the support pin 34. Connected to the clutch lever 35 is a front distal end 36a of a clutch cable 36. A rear distal end 36b of the clutch cable 36 is connected to a lower distal end 56c of an arm 56 shown in FIG. 1.

When pulling the clutch cable 36 in an arrow shown in FIG. 2, the clutch lever 35 is operated to tilt in a rear surface direction of FIG. 2 to cause the support pin 34 to be rotated clockwise. Clockwise rotation of the pin 34 allows the clutch cam 33 to tilt for thereby permitting the clutch shifter 32 to slide in a front surface direction of FIG. 2 (i.e. in a rightward direction in FIG. 3).

Referring to FIG. 3, a distal end of the clutch shifter 32 has a cone-shaped portion. A peripheral surface 37a of the cone-shaped portion 37 is able to be brought into contact with a lining 38 fixedly mounted in a hub 39 of the bevel gear 22b. The bevel gear 22b is mounted on the rear-wheel drive shaft 23. Thus, by pulling the clutch cable 36 in the direction as shown by the arrow in FIG. 2, the clutch cam 33 is pivoted to allow the clutch shifter 32 to slide toward the bevel gear 22b in the direction as shown by the arrow such that the peripheral surface 37a of the cone-shaped portion 37 is brought into contact with the lining 38. With such a structure, the running clutch 30 can be used in a slipping phase or state.

The term "slipping phase" used herein refers to a state wherein a slipping condition or half-connected state is normally maintained between the peripheral surface 37a of the cone-shaped portion 37 of the clutch shifter 32 and the lining 38 of the bevel gear 22b. Rendering the clutch to be maintained in the slipping phase or state compel a rotational force of the bevel gear 22b remaining at a side of the engine 14 (see FIG. 1) to be delivered to the cone-shaped portion 37, located at the side of the rear wheels 13 (see FIG. 1), under a controlled state. Consequently, it is possible for the walk behind working machine to start off at a low speed.

Also, the running clutch 30 is of a wet-type clutch which is internally filled with lubricating oil to enable the periphery surface 37a of the cone-shaped portion 37 and the lining 38 fixedly mounted to the hub 39 of the bevel gear 22b to resist the slip condition in an extended period of time.

Figure 4:
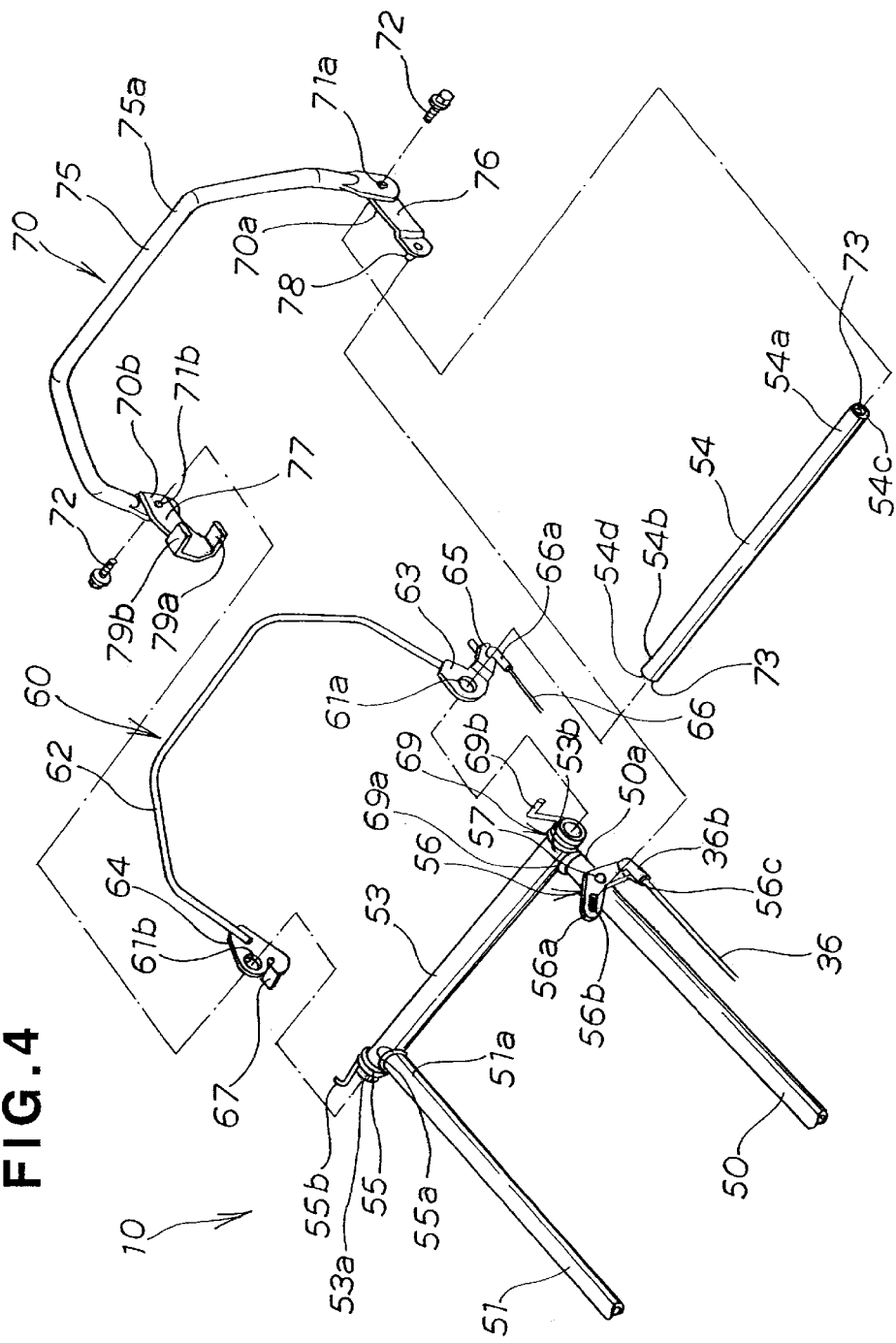
FIG. 4 is a perspective view illustrating handles and levers, etc., forming part of the first embodiment.

FIG. 4 shows the brake lever 60 and the grip/clutch lever 70, to be mounted to a handle body defined by right and left handles 50, 51, which form an important feature of the walk behind lawnmower of the first preferred embodiment of the present invention.

The walk behind lawnmower 10 has a structure wherein a connecting pipe 53 transversely extends between and is connected to respective rear distal ends 50a, 51a of the right and left hands 50, 51. Inserted through the connecting pipe 53 is a retainer rod 54 which has right and left distal end portions 54a, 54b which protrude outward from the connecting pipe 53 and which are held in mating engagement with right and left mounting bores 61a, 61b, respectively, with right and left proximal ends 70a, 70b of the grip/clutch lever 70 being held in abutting engagement with right and left distal edges 54c, 54d of the retainer rod 54, respectively. Right and left bolts 72, 72 are inserted through mounting apertures 71a, 71b of the right and left proximal ends 70a, 70b, respectively, and are screwed into threaded bores 73, 73 of the right and left distal edges 54c, 54d, thereby permitting the brake lever 60 and the grip/clutch lever 70 to be mounted on the retainer rod 54 for swinging movement in fore and aft directions.

The brake lever 60 is constructed of a substantially U-shaped gripping rod 62, and right and left mounting plates 63, 64 fixedly secured to right and left ends of the gripping rod 62. The left mounting plate 63 has the mounting bore 61a through which the left distal end portion 54a of the retainer rod 54 is enabled to be inserted, and a protruding end 65 to which a rear end 66a of the brake cable 66 is fixedly secured. On the other hand, the right mounting plate 64 has the mounting bore 61b through which the right distal end portion 54b of the retainer rod 54 is enabled to be inserted, and a stopper segment 67 for retaining the brake lever 60 in a braked position P3 (see FIGS. 5 and 6).

Figure 5:
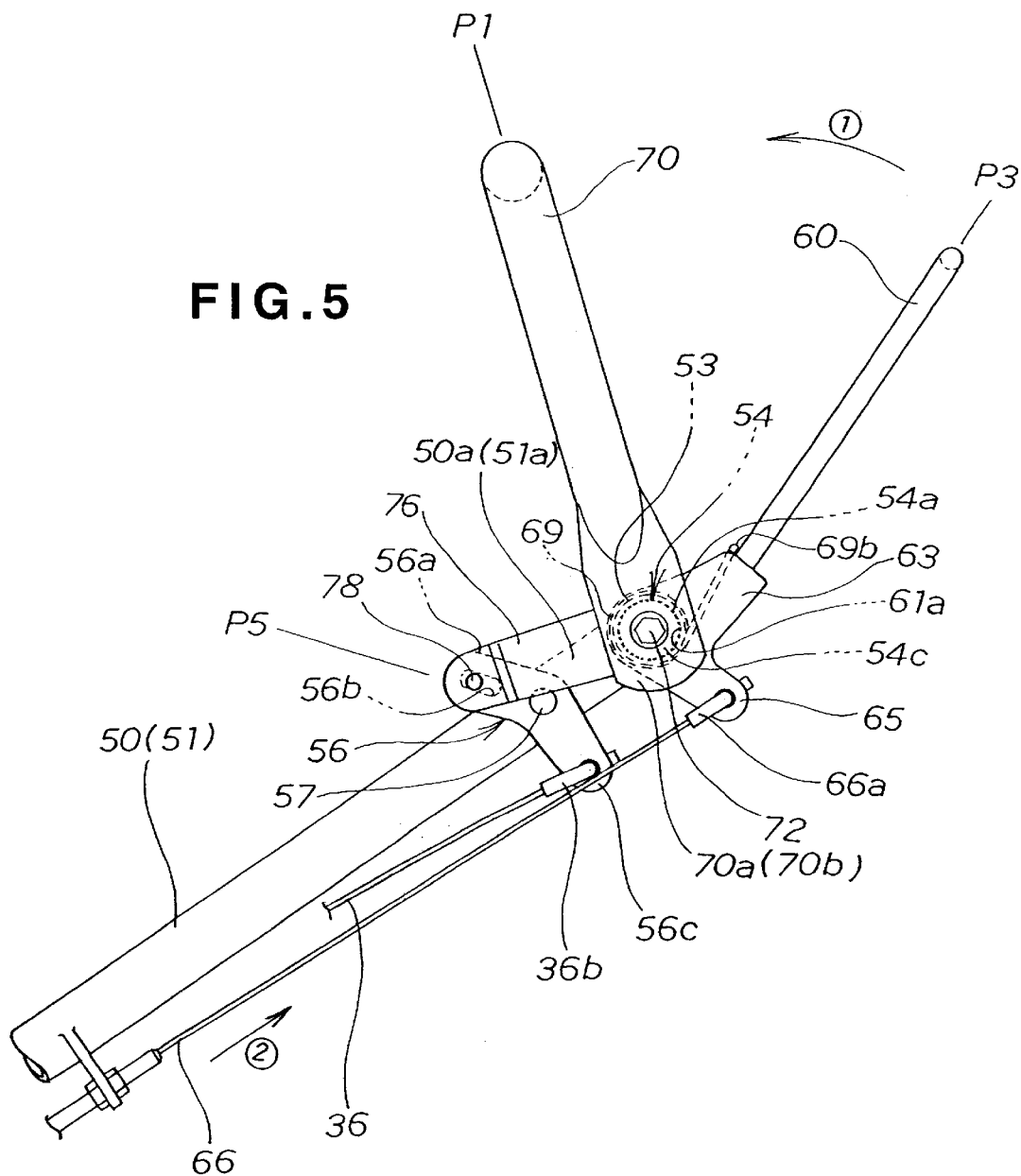
FIG. 5 is a side view of the handles and levers, shown in FIG. 4, as assembled.

A return spring 69 engages a left distal end of the connecting pipe 53, and has one end 69a which is hooked to a rear distal end 50a of the left handle 50 and the other end 69b which is hooked to the left distal end of the gripping rod 62, thereby urging the brake lever 60 in the rearward braked position P3 (see FIG. 5).

The grip/clutch lever 70 is substantially formed in the same configuration as the brake lever 60 and has a U-shaped gripping pipe 75 with right and left proximal ends 70a, 70b which are formed with the mounting apertures 71a, 71b, respectively, a cable arm 76 mounted to the left end of the gripping pipe 75, and a stopper arm 77 mounted to the right end (i.e. of the proximal end) of the gripping pipe 75. A central area of the gripping pipe 75 has a gripping portion 75a. The proximal end of the cable arm 76 has the mounting apertures 71a, and a distal end thereof has a connecting pin 78. The proximal end of the stopper arm 77 has the mounting apertures 71b, with a distal end of the stopper arm 77 having a stopper segment (stopper) 79a for retaining the grip/clutch lever 79 at a stop position (remaining at a rear position) P1 (see FIG. 5) and an operating stopper segment (stopper) 79b for retaining the grip/clutch lever 70 in an operative position (remaining at a front position) P2 (see FIG. 8).

A right distal end 53a of the connecting pipe 53 engages a return spring 55, which has one end 55a engaging a rear end 51a of the right handle 51 and the other end engaging the right proximal end 70b of the grip/clutch lever 70, thereby urging the grip/clutch lever 70 in the rearward stop position P1 (see FIG. 5).

A dog-legged arm 56 is pivotally mounted to the left handle 50 in the vicinity of a rear distal end 50a thereof via a mounting pin 57. An upper distal end 56a of the arm 56 is formed with an elongated slot 56b which engages the connecting pin 78, with a lower distal end 56c being connected to a rear distal end 36b of the clutch cable 36.

Figure 6:
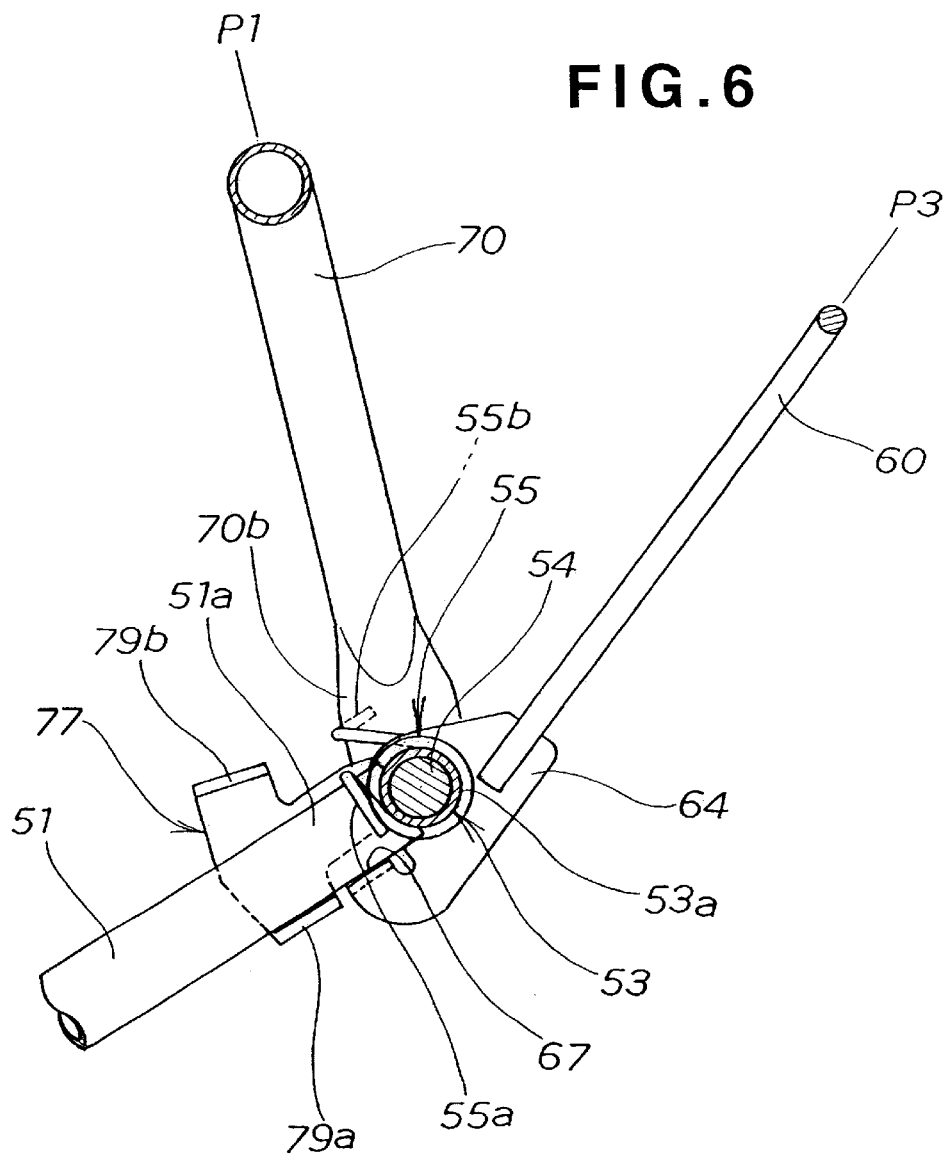
FIG. 6 is a partial cross-sectional view, wherein a central area covering the levers, etc., is shown in cross section, illustrating a right handle and the levers.

FIGS. 5 and 6 show conditions wherein the brake lever 60 and the grip/clutch lever 70 are pivotally mounted for rocking movements in fore and aft directions about the retainer rod 54.

In FIG. 5, the mounting bores 61a and 61b of the brake lever 60 are fitted on the right and left distal end portions 54a, 54b (with the distal end portion 54b being not shown) of the retainer rod 54 inserted through the connecting pipe 53 integrally connected to the respective rear distal ends of the handles 50, 51. The grip/clutch lever 70 is located outwardly of the brake lever 60, with the right and left proximal ends 70a, 70b of the grip/clutch lever 70 being mounted to the right and left distal ends 54c, 54d (see FIG. 4 for the right distal end) of the retainer rod 54 by means of the right and left bolts 72, 72. With such an arrangement, the brake lever 60 and the grip/clutch lever 70 are rendered to pivot about the center of the retainer rod 54.

Further, FIG. 5 shows a condition wherein the arm 56 is pivotally mounted to the left handle 50 in the vicinity of the rear distal end 50a thereof for rocking movements, and the connecting pin 78 is fitted to the elongated slot 56b of the upper end 56a to cause the arm 56 to be connected to the grip/clutch lever 70 via the cable arm 76 and where the rear distal end 36b of the clutch cable 36 is secured to the lower end 56c of the arm 56.

In addition, FIG. 5 shows a condition wherein the left mounting plate 63 of the brake lever 60 has the protruding end 65 to which the rear end 66a of the brake cable 66 is secured.

In FIG. 6, the return spring 55 is fitted to the right distal end 53a of the connecting pipe 53, and has the one end 55a engaging the rear distal end 51a of the right handle 51 and the other end 55b engaging the right proximal end 70b of the grip/clutch lever 70. With such an arrangement, the grip/clutch lever 70 is urged toward the rear stop position P1 with the action of the return spring 55 to compel the stopper segment 79a to be brought into abutting contact with the rear distal end 51a of the right handle 51 to enable the grip/clutch lever 70 to be retained in the rear stop position P1.

On the other hand, when shifting the grip/clutch lever 70 to the front operating position P2 (see FIG. 8), the operating stopper segment 79b is brought into abutting contact with the rear distal end 51a of the right handle 51, thereby retaining the grip/clutch lever 70 in the front operating position P2. The operating position P2 will be described below in detail with reference to FIG. 8.

Thus, the grip/clutch lever 70 is formed at its lower end with the stopper segments 79a, 79b which restrict the fore and aft movements of the grip/clutch lever 70. As a consequence, when operating the grip/clutch lever 70, it is possible for the operator's hand to be precluded from interfering with the stopper segments 79a, 79b, thereby improving the maneuverability or operability of the grip/clutch lever 70.

Further, this drawing shows a condition where rendering the stopper segment 67 of the brake lever 60 to be brought into contact with the right handle causes the brake lever 60 to be retained in the rear braking position P3.

Now, the operation of the brake lever 60 and the grip/clutch lever 70 is described with reference to FIGS. 7 to 9.

First, when cutting the grass with the lawnmower, the operator touches the brake lever 60 as seen in FIG. 5 and then shifts the brake lever 60 about the retainer rod 54 from the braking position P3 as shown by arrow ① in a swung fashion. When this takes place, the brake cable 66 is pulled with the protruding end 65 of the brake lever 60 in a direction as shown by an arrow ②.

Figure 7:
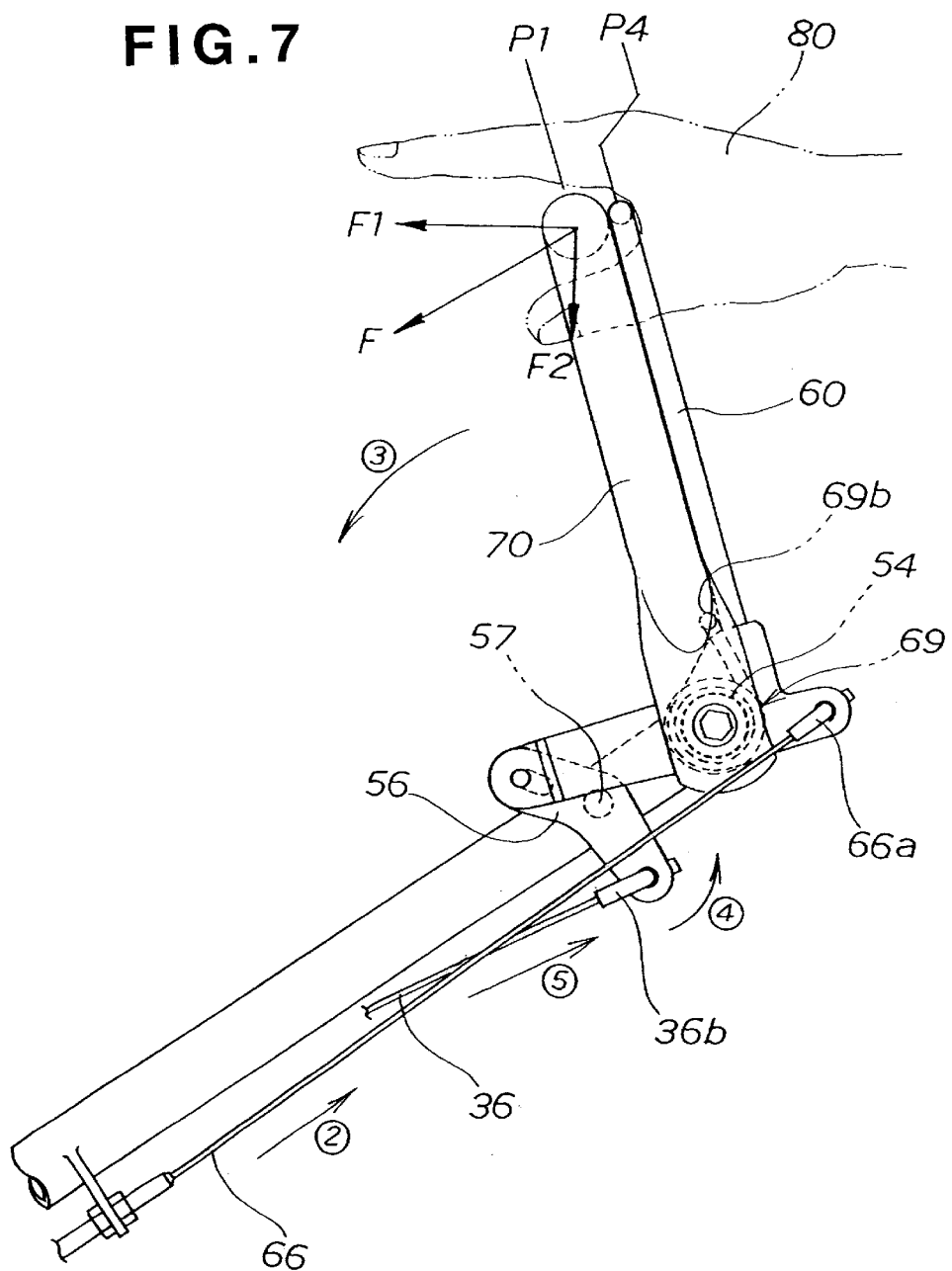
FIG. 7 is a side view illustrating a condition wherein a brake lever is tilted from a rest position shown in FIG. 5 to a brake-releasing position.

Then, in FIG. 7, the brake lever 60 is tilted to the brake-releasing position P4 until it is brought into abutting contact with the grip/clutch lever 70. Tilting the brake lever 60 to the brake-releasing position P4 causes the brake for the cutter 16 (see FIG. 1) to be released, with the clutch for the cutter 16 being turned on to initiate rotation of the cutter 16.

Under such a condition, the operator's hand 80 applies a pushing force F1 onto the grip/clutch lever 70 in a horizontal direction. When this occurs, the hand 80 is applied to the grip/clutch lever 70 by its own weight F2. Accordingly, a resultant composite force F, i.e. the pushing force F1 and the own weight F2, is applied in a direction as shown by an arrow. The composite force F is substantially aligned in an orientation wherein the grip/clutch lever 70 is tilted about the center of the retainer rod 54. Consequently, applying the pushing force F1 to the grip/clutch lever 70 with the operator causes the grip/clutch lever 70 to be tilted about the center of the retainer rod 54 from the stop position P1 as shown by an arrow ③ in an efficient fashion. The brake lever 60, which remains at the brake-releasing position P4, is tilted together with the lever 70 about the center of the retainer rod 54 as shown by the ③.

Tilting the grip/clutch lever 70 as shown by the ③ causes the arm 56 to be tilted about the shaft of the mounting pin 57, pulling the clutch cable 36 in a direction as shown by an arrow ④. With such an action, the clutch cable 36 shown in FIG. 2 is pulled in a direction as shown by the arrow to allow the clutch lever 35 to be tilted in the upper surface direction of FIG. 2, thereby shifting the clutch shifter 32 in a direction as shown by the arrow shown in FIG. 3 via the clutch cam 33.

Thereafter, when the grip/clutch lever 70 is tilted to a given position, the cone-shaped surface 37a of the clutch shifter 32 is brought into contact with the lining 38 to cause the running clutch 30 to be brought into the slipping state. Thus, the walk behind lawnmower 10 is allowed to start off in a forward direction at the low speed.

Figure 8:
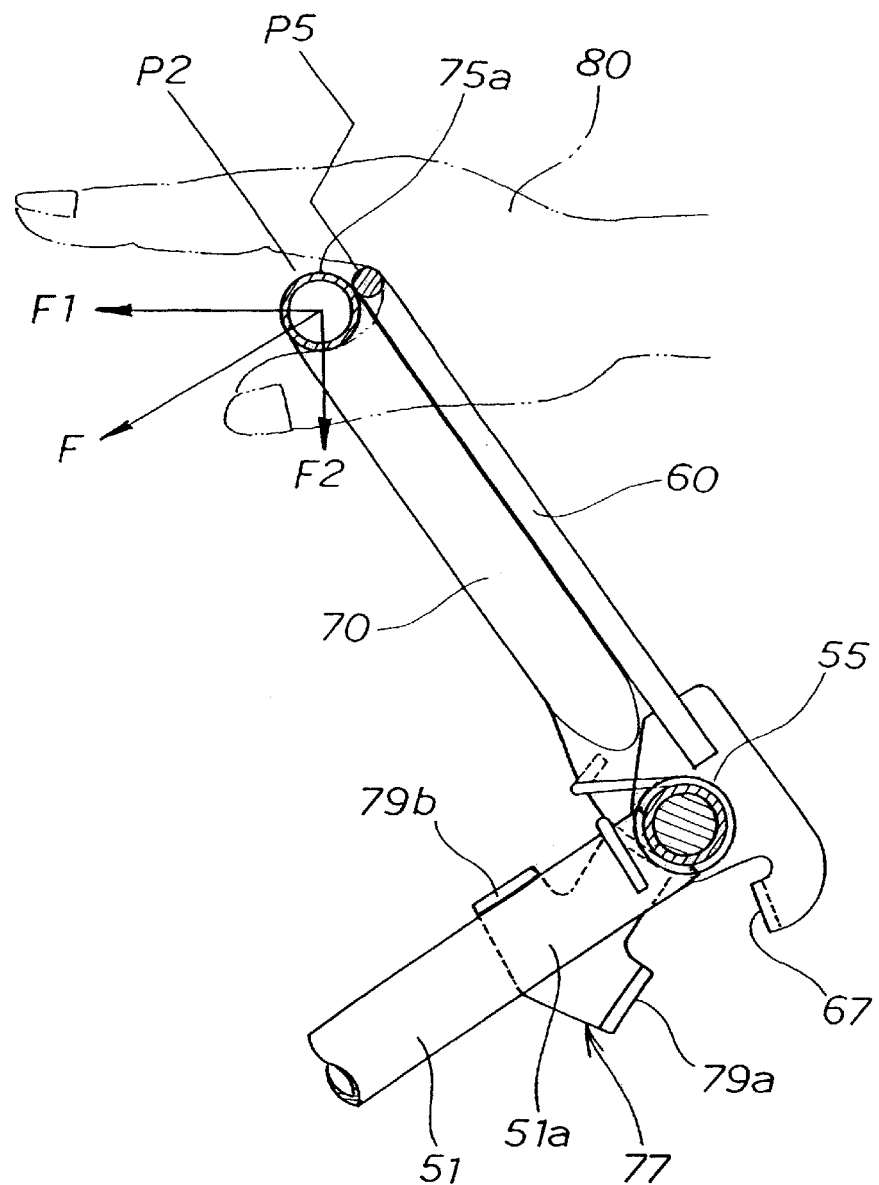
FIG. 8 is a partial cross-sectional view illustrating a condition wherein the brake lever and a grip/clutch lever are tilted from a condition shown in FIG. 7 to an operating position.

In FIG. 8, the grip/clutch lever 70 is tilted to the operating position P2, and the brake lever 60 is also tilted to the operating position P5 together with the grip/clutch lever 70. The operating stopper segment 79b of the grip/clutch lever 70 is brought into abutting contact with the rear distal end of the right handle 51 to cause the grip/clutch lever 70 to be held stationary at the front operating position P2 and to cause the brake lever 60 to be held stationary at the operating position P5.

Thus, the right proximal end 70b (see FIG. 4) of the grip/clutch lever 70 has the stopper arm 77 formed with the stopping and operating stopper segments 79a, 79b for restricting the fore and aft movements of the grip/clutch lever 70. Therefore, since the respective stopper segments 79a, 79b are enabled to be separated from the grip portion 75a of the grip/clutch lever 70, it is possible for the operator's hand 80 to be prevented from interfering with the stopper segments 79a, 79b during operation of the grip/clutch lever 70. This results in a highly improved operability of the grip/clutch lever 70.

Figure 9:
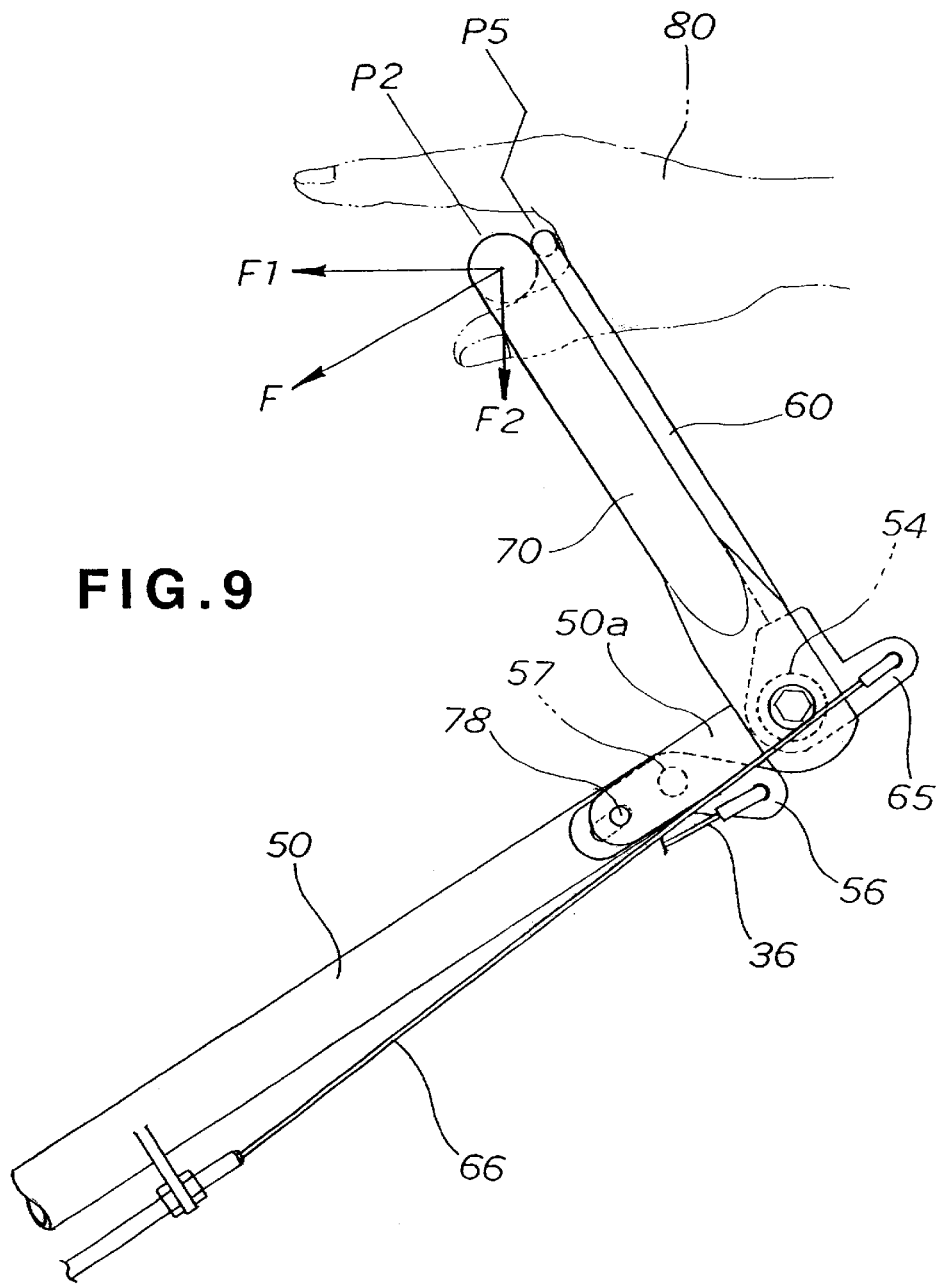
FIG. 9 is a side view illustrating an action of forces imparted to the grip/clutch lever under the condition shown in FIG. 8.

In FIG. 9, tilting the grip/clutch lever 70 to the operating position P2 causes the cone surface 37a of the clutch shifter 32 to be surely brought into contact with the lining 38 such that the running clutch 30 is brought into a coupled or connected state, allowing the walk behind lawnmower 10 shown in FIG. 1 to travel in the forward direction. When this takes place, the brake for the cutter 16 (shown in FIG. 1) is released while the clutch for the cutter 16 remains coupled, with the cutter 16 remaining in a rotating condition. Accordingly, the walk behind lawnmower 10 is enabled to travel forward while enabling the cutter 16 to cut the grass.

Also, in the first preferred embodiment, as shown in FIG. 8, it is so constructed that bringing the operating stopper segment 79b of the grip/clutch lever 70 into abutting engagement with the rear distal end 51a of the right handle 51 allows the grip/clutch lever 70 to remain stationary at the operating position P2 while the running clutch 30 (see FIG. 3) is held in the connected state, the present invention is not limited thereto and it may be modified such that it is possible for the grip/clutch lever 70 to reach the operating position P2 to cause the running clutch 30 to be brought into the connected state before the operating stopper segment 79b of the grip/clutch lever 70 is brought into abutting engagement with the rear distal end 51a of the right hand 51. In this case, the cone surface 37a of the clutch shifter 32 shown in FIG. 3 is brought into pressured contact with the lining 38 such that the grip/clutch lever 70 is held stationary at the operating position P2.

Figure 10:
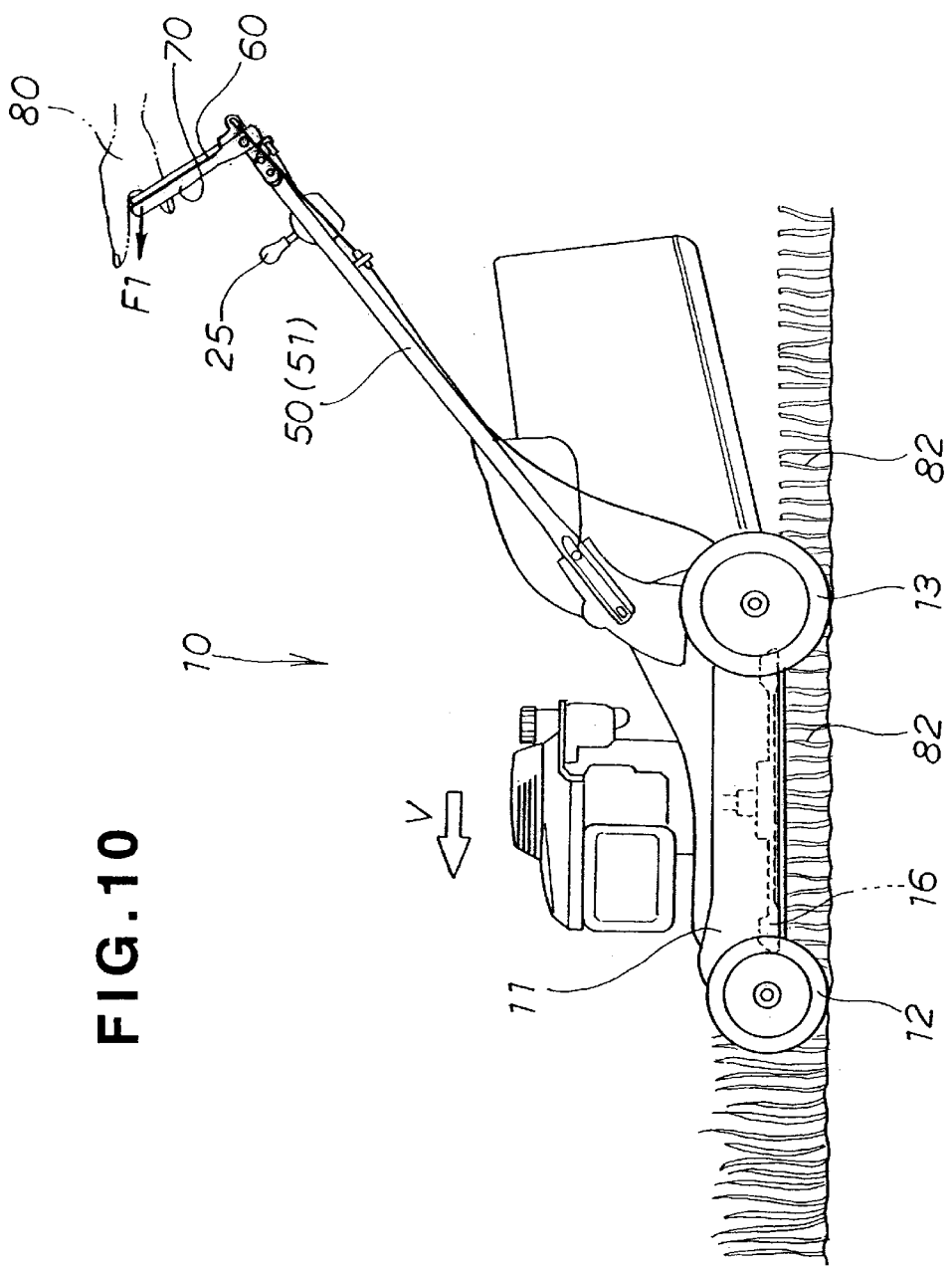
FIG. 10 is a view illustrating a condition wherein the walk behind working machine according to the first preferred embodiment cuts a grass.

FIG. 10 shows a traveling state of the walk behind lawnmower 10 with the running clutch 30 shown in FIG. 3 remaining in the slipping state.

Due to the slipping state of the running clutch 30, the walk behind lawnmower 10 starts off at the low speed V. During this movement, since the operator's hand 80 applies the pushing force F1 to the grip/clutch lever 70 and the brake lever 60 in the forward direction and in a horizontal direction, i.e., in a traveling direction of the walk behind lawnmower 10, it is possible for the operator to manipulate the walk behind lawnmower 10 in a natural motion. This results in a smooth start-off of the walk behind lawnmower 10 to allow the same to cut the grass in a high quality finish.

Further, the presence of the slipping phase of the running clutch 30 performed during a time interval in which the grip/clutch lever 70 is forced forward allows the operator to move following the start-off movement of the walk behind lawnmower 10 in the natural motion during the start-off period of the walk behind lawnmower 10. As a result, the walk behind lawnmower 10 may be operating in a simple manner.

In addition, during working operation of the walk behind lawnmower 10, adjusting (i.e. applying a force in strength and weakness) the forward pushing force of the grip/clutch lever 70 enables the working speed of the walk behind lawnmower 10 to be adjusted in an easy fashion in dependence on a working status.

On the other hand, when it is desired to shift the traveling direction of or to move the walk behind lawnmower 10 rearward, the grip/clutch lever 70 and the brake lever 60 are first pulled rearward, tilting these components to the stop position P1 and the brake-releasing position P4 (sown in FIG. 7), respectively. During such tilting movement, the stopping stopper segment 79a (shown in FIG. 6) of the grip/clutch lever 70 is brought into abutting contact with the rear distal end 51a of the right handle 51, thereby restricting further tilt of the grip/clutch lever 70. Under this circumstance, the running clutch 30 shown in FIG. 3 is turned off, rendering the rear wheels 13 to be freely moveable. Accordingly, the operator may shift the traveling direction of or to move the walk behind lawnmower 10 rearward while retaining the grip/clutch lever 70 and the brake lever 60 in their gripped states.

Further, it is constructed such that the grip/clutch lever 70 also serves as the grip of the handles 50, 51 in combined use. Accordingly, it is possible to save troublesome efforts to manipulate the clutch lever while gripping the grip of the handles that would be otherwise required in the conventional working machine. Thus, operation is simplified to enable the operator's load to be minimized.

Now, a description is made for a spring force of the spring force (shown in FIG. 6) of the grip/clutch lever 70.

If the return spring 55 of the grip/clutch lever 70 is settled to have an excessively large spring force, the grip/clutch lever 70 encounters a difficulty in a smooth returning operation owing to a quick restoring movement of the spring during a restoring movement from the operating position P2 (see FIG. 9) to the stop position P1 (see FIG. 6). For this reason, when taking the restoring movement of the grip/clutch lever 70 from the operating position P2 to the stop position P1 into consideration, it is preferred that the spring force of the returning spring 55 is limited to some extents.

However, where the spring force of the return spring 55 is excessively small, it is highly likely that the grip/clutch lever 70, when applied with only a small force (i.e., downward force F1), is tilted or pivoted forward from the stop position P1.

To this end, the brake lever 60 is arranged such that it includes the return spring 69, whose spring force is combined with the spring force of the return spring 55 (see FIGS. 6 and 7), whereby, when only a suitable operating force is applied, the grip/clutch lever 70 and the brake lever 60 are tilted forward. With such an arrangement, the grip/clutch lever 70 may be smoothly restores from the operating position P2 to the stop position P1 and the grip/clutch lever 70 may be precluded from unintentionally tilting forward from the stop position P1, resulting in further improved operability.

Also, in the first preferred embodiment, although a description has been made in conjunction with the brake lever 60 associated with the return spring 69, it is possible to provide a return spring in the vicinity of the clutch/brake of the cutter 16 in stead of the return spring 69.

Thus, in a case where, in stead of the return spring 69, the return spring is provided in the clutch/brake remaining at one side of the cutter 16, it seems that it is difficult for the brake lever 60 to be smoothly restored from the brake-releasing position P4 to the brake position P3.

However, during restoring movement of the grip/clutch lever 70 from the operating position P2 to the stop position P1 with the action of the return spring 55, the brake lever 60 is restored from the operating position P5 (see FIG. 8) to the brake-releasing position P4 (see FIG. 7) together with the grip/clutch lever 70 with the spring force of the return spring 55.

The brake lever 60, which is restored to the brake-releasing position P4, is subjected to an inertial force to be tilted rearward with the spring force of the return spring 55 for the grip/clutch lever 70, with the inertial force being utilized to enable the brake lever 60 to be restored from the brake-releasing position P4 to the brake position P3 (see FIG. 5) in a smooth fashion.

Also, in the first preferred embodiment, although it is so constructed such that, when the running clutch 30 (see FIG. 3) is held in the slipping state, in the course of swinging movement or shifting of the grip/clutch lever 70 from the stop position P1 (see FIG. 5) to the operating position P2 (see FIG. 9), to allow the grip/clutch lever 70 to reach the operating position P2, the running clutch 30 is coupled, it may be also constructed such that, under a condition wherein the grip/clutch lever 70 remains stationary at the operating position P2, the running clutch 30 is continuously maintained in the slipping state.

Further, it may be so constructed such that, before bringing the operating stopper lever 79b of the grip/clutch lever 70 into abutting engagement with the rear distal end 51a of the right handle 51, the grip/clutch lever 70 is moved to the operating position P2 to operate the running clutch 30 in the slipping phase. In such a case, pressing the cone surface 37a of the clutch shifter 32 shown in FIG. 3 against the lining 38 allows the grip/clutch lever 70 to remain stationary at the operating position P2.

Thus, the presence of the structure wherein the running clutch 30 is held in the slipping phase under the condition wherein the grip/clutch lever 70 is held stationary at the operating position P2 enables the cutter 16 (shown in FIG. 1) to cut the grass while allowing the running clutch 30 of the walk behind lawnmower 10 to remain in the slipping state to keep traveling state of the front and rear wheels 12, 13.

With such a walk behind lawnmower 10 thus constructed, it is possible to obtain the same results as those obtained in the first preferred embodiment.

Also, it is so constructed such that the surface 37a of the cone 37 and the lining 38 of the hub 39 resist slippage in a long period of time to allow the running clutch 30 shown in FIGS. 2 and 3 to have capability of performing the grass cutting operation under the slipping state.

Now, a lever structure of a second preferred embodiment is described in conjunction with FIGS. 11 to 17. Also, the same component parts as those of the first preferred embodiment bear the same reference numerals as used therein and a detailed description of the same is herein omitted.

Figure 11:
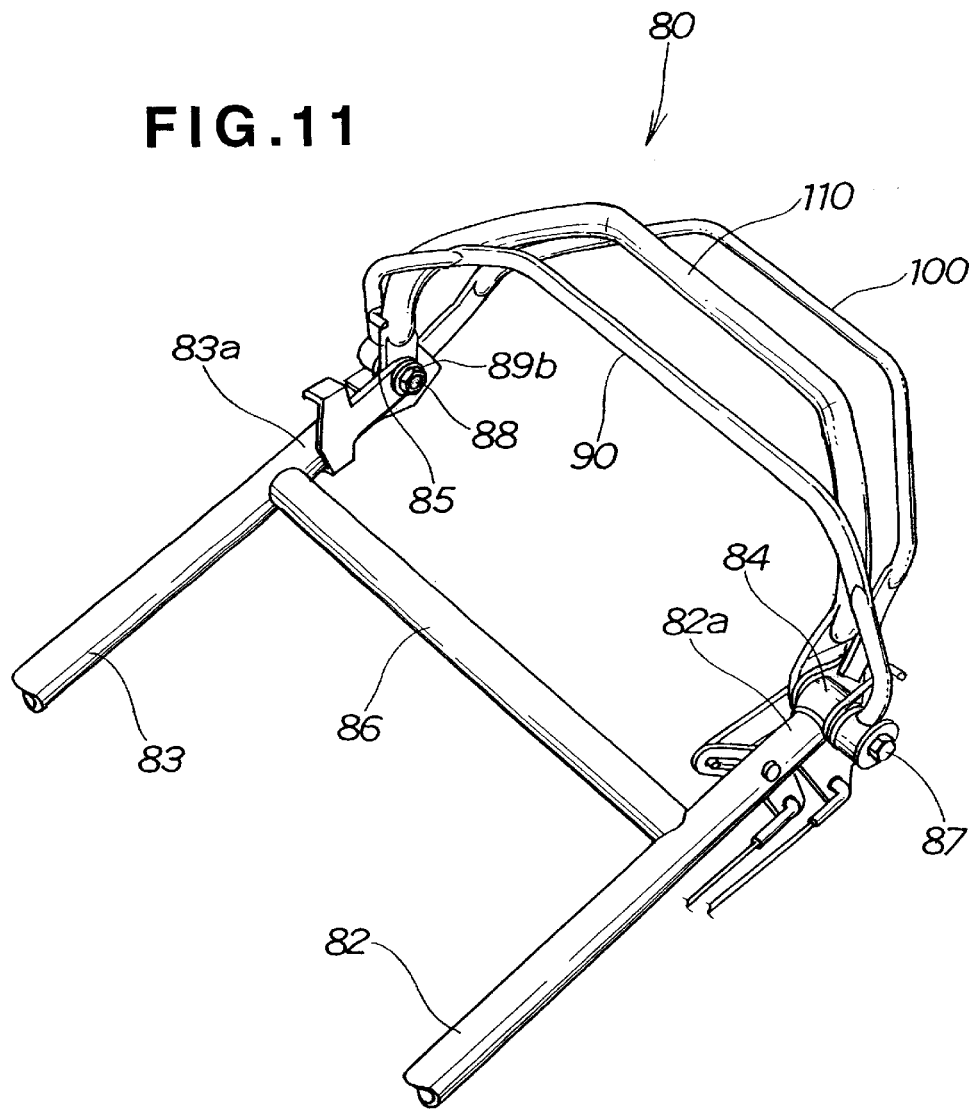
FIG. 11 is a perspective view illustrating a walk behind working machine according to a second embodiment wherein levers, etc., are mounted to handles.

In FIG. 11, a walk behind lawnmower 80 has the lever structure wherein a connecting pipe 86 transversely extends between right and left handles 82, 83 in the vicinities of rear distal ends 82a, 83a thereof, with the rear distal ends 82a, 83a being formed with boss portions 84, 85, respectively, to which a hold lever 90, a brake lever 100 and a grip/clutch lever 110 are mounted with right and left fixture bolts 87, 88 for swinging movement.

The hold lever 90 is located in a forward position, with the brake lever 100 being positioned in a rearward position and with the grip/clutch lever 110 being located between the hold lever 90 and the brake lever 100.

Also, the right and left handles 82, 83 are arranged to extend rearward of the machine body 11 (see FIG. 1) like the handles 50, 51 in the first preferred embodiment shown in FIG. 1.

Figure 12:
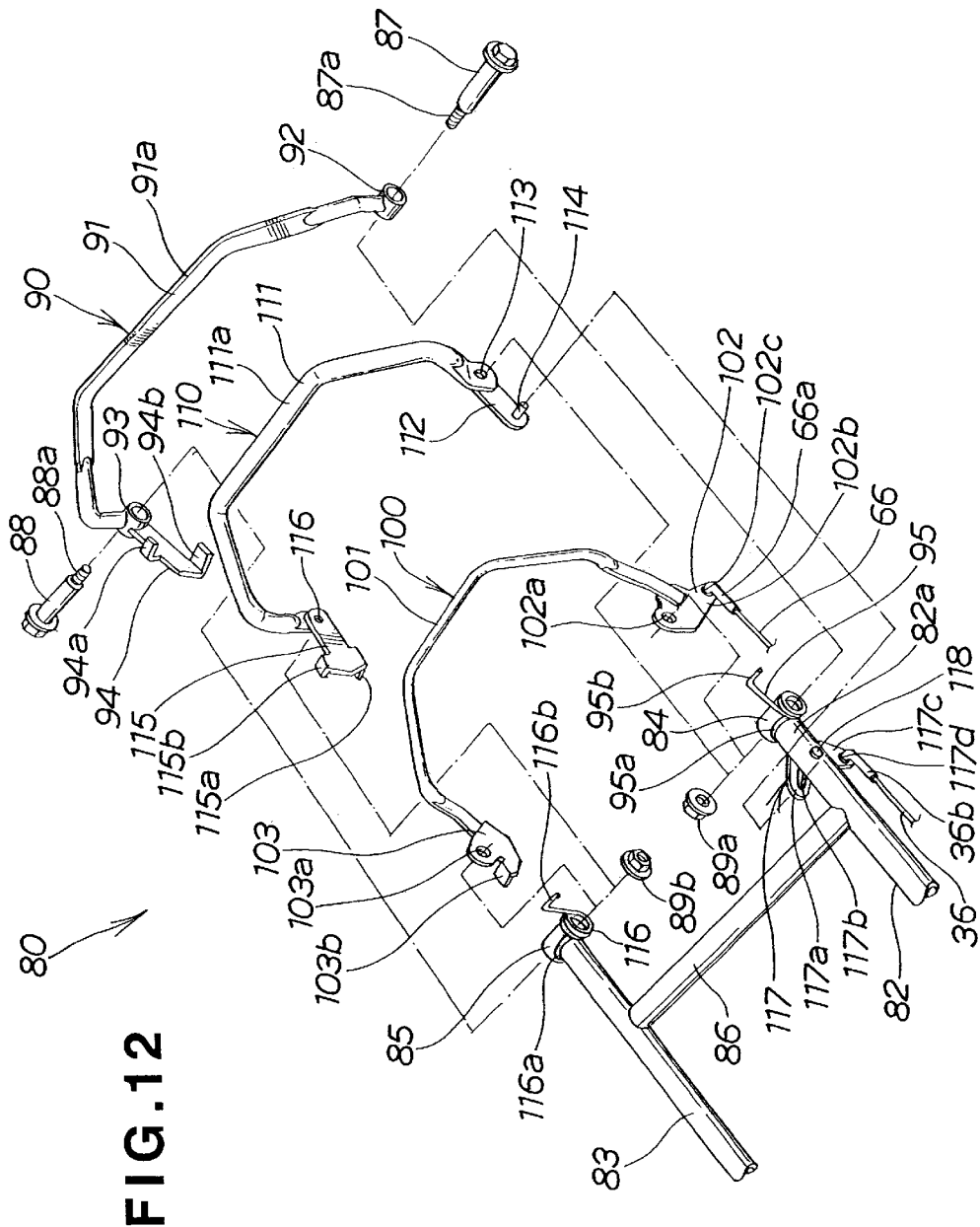
FIG. 12 is an exploded perspective view of the handles and the levers, etc., shown in FIG. 11.

In FIG. 12, the hold lever 90 is comprised of a substantially U-shaped gripping pipe 91, right and left boss portions 92, 93 mounted to right and left distal ends of the gripping pipe 91, and a stopper arm 94 mounted to the right boss portion 93. The gripping pipe 91 is composed of a member having a central portion (gripping portion) 91a formed in a substantially elliptical shape in cross section, with each of right and left distal ends being formed into a circular shape.

The left boss portion 92 of the hold lever 90 is located outward of the left boss portion 84 secured to the left handle (handle) 82, with a left retainer bolt 87 being fitted through the left boss portions 92, 84. Also, the left boss portion 93 of the hold lever 90 is located outward of the left boss portion 85 secured to the right handle (handle) 83, with a right retainer bolt 88 being fitted through the left boss portions 93, 85. Thus, the hold lever 90 is mounted to the rear distal ends of the right and left handles 82, 83 for swinging movements.

Figure 13:
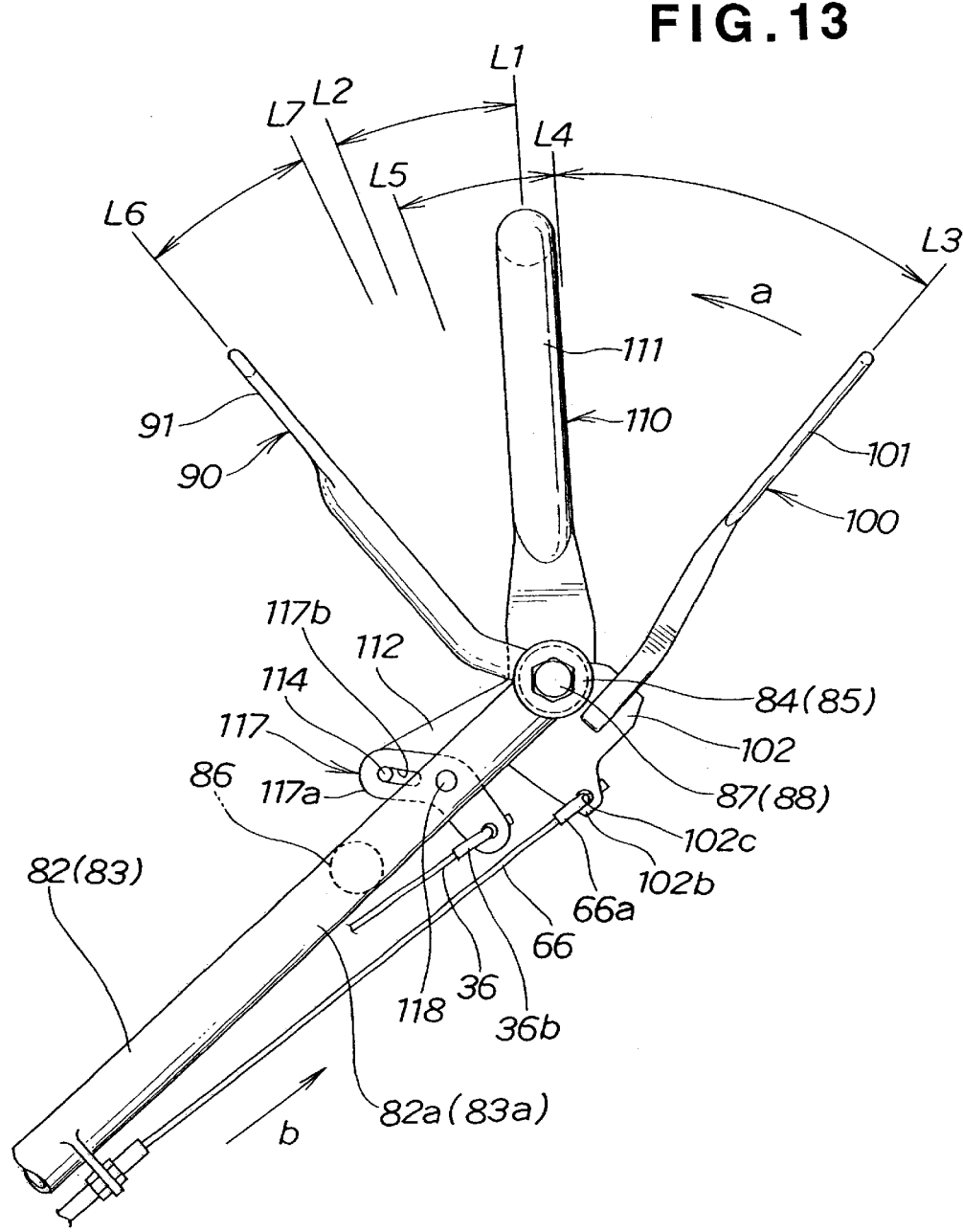
FIG. 13 is a side view of the handles and the levers, etc., shown in FIG. 11.
Figure 14:
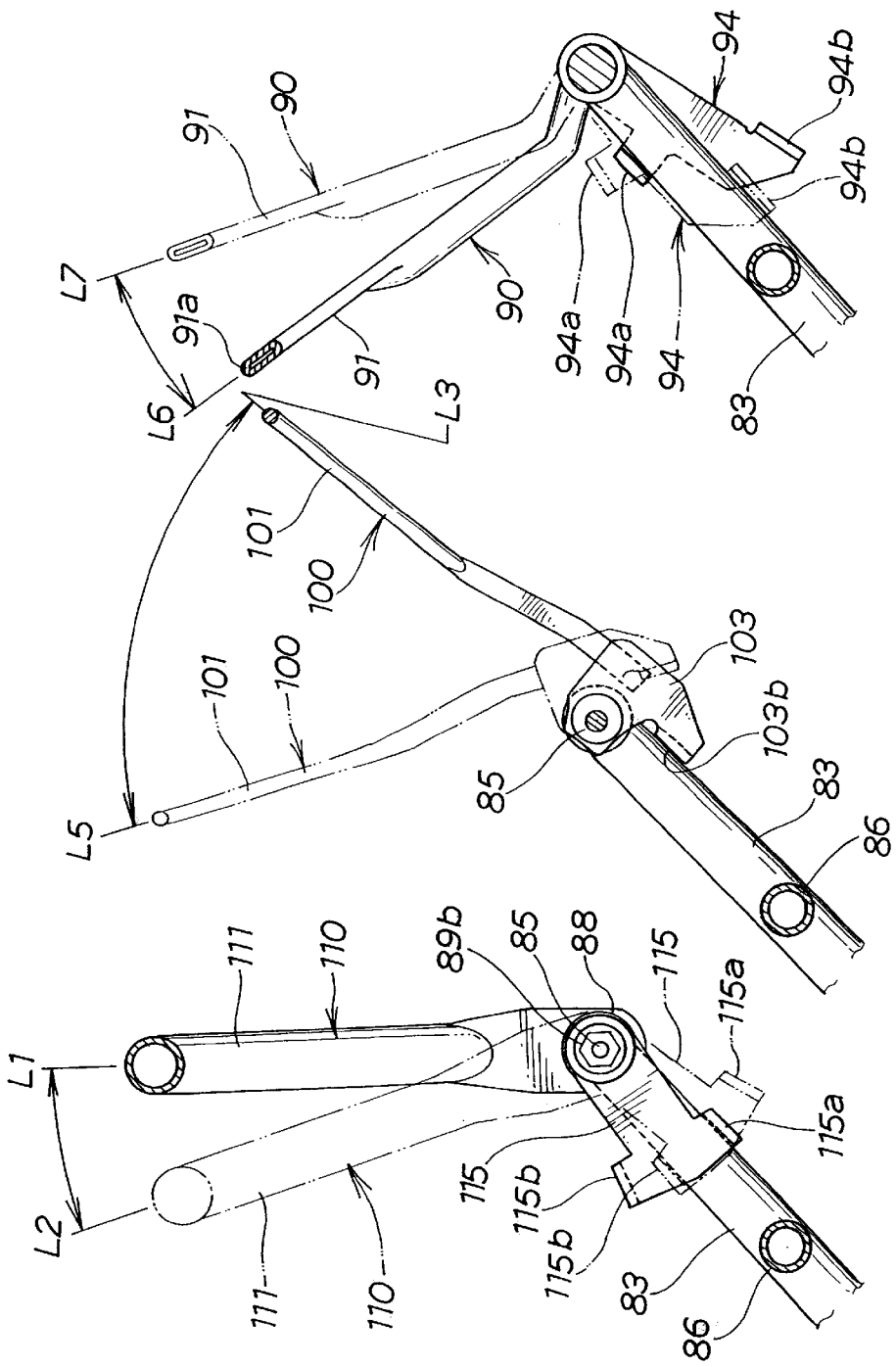
FIGS. 14A to 14C are views illustrating operations of stoppers associated with respective levers, etc., shown in FIG. 11.

The stopper arm 94 is composed of a plate which protrudes forward from the right boss portion (i.e., proximal end) 93 of the hold lever 90 and which has an upper central area formed with a resting stopper segment (i.e., stopper) 94a and a lower distal end formed with a gripping stopper segment (i.e., stopper) 94b for retaining the hold lever 90 at a rearward gripping position L7 (shown in FIG. 13).

Also, it is possible to construct such that the hold lever 90 is retained at a forward resting position L6 with an own weight of the hold lever 90 without mounting the return spring 95.

The brake lever 100 is comprised of a gripping rod 101 formed in the substantially same U-shape as the gripping pipe 91 of the hold lever 90, and right and left mounting plates 102, 103 secured to right and left distal ends of the gripping rod 101. The left mounting plate 102 has a mounting bore 102a which is able to fit the left retainer bolt 87, with a protruding end 102b being formed with a bore 102c to which a rear distal end 66a of a brake cable 66 is fixed. The right mounting plate 103 has a mounting bore 103a which is able to fit to the right retainer bolt 88 and a stopper segment 103b for retaining the brake lever 100 at a brake position L3 (shown in FIG. 13).

The left mounting plate 102 of the brake lever 100 is located inward of the left boss portion 84 secured to the left handle 82, with the retainer bolt 87 being fitted to the mounting bore 102a of the left mounting plate 102. Further, the right mounting plate 103 of the brake lever 100 is located inward of the right boss portion 85 secured to the right handle 83, with the retainer bolt 88 being fitted to the mounting bore 103a of the right mounting plate 103. With such an arrangement, the brake lever 100 is mounted to the rear distal ends of the right and left handles 82, 83 for swinging movement.

The grip/clutch lever 110 is comprised of a gripping pipe 111 formed in the substantially the same U-shape as the gripping pipe 91 of the hold lever 90, a cable arm 112 fixed to a left distal end of the gripping arm 111, and a stopper arm 115 fixed to a right distal end (proximal end) of the gripping pipe 111. The gripping pipe 111 has a central portion formed with a gripping portion 11a. Mounting bores 113 are formed in a left distal end of the gripping pipe 111 and a proximal end of the cable arm 112, and mounting bores 116 are formed in a right distal end of the gripping pipe 111 and a proximal end of the stopper arm 115.

The cable arm 112 is composed of a plate which protrudes forward from the left distal end of the gripping pipe 111 and which includes a member which has a distal end formed with a connecting pin 114 which protrudes outward.

The stopper arm 115 is composed of a plate which protrudes forward from the right distal end (a proximal end) of the gripping pipe 111, and has a lower distal end formed with a resting stopper segment (stopper) 115a to maintain the grip/clutch lever 110 at the stop position (remaining at the rear position) L1 (shown in FIG. 13) and an upper distal end formed with an operating stopper segment (stopper) 115b for maintaining the grip/clutch lever 110 at the operating position (remaining at the forward position) L2 (shown in FIG. 13).

The left distal end of the grip/clutch lever 110 is located inside the left distal end of the brake lever 100, with the mounting bore 113 being fitted to a threaded portion 87a of the left retainer bolt 87. Also, the right distal end of the grip/clutch lever 110 is located inside the right distal end of the brake lever 100, with the mounting bore 116 being fitted to a threaded portion 88a of the right retainer bolt 88. Then, right and left nuts 89a, 89b are screwed to the right and left retainer bolts 87, 88, respectively. Thus, the grip/clutch lever 110 is swingably mounted to rear distal ends of the right and left handles 82, 83.

The return spring 116 is fitted to the right boss portion 85 of the right handle 83 and has one end 116a engaging the rear distal end 83a of the right handle 83 and the other end 116b engaging the right proximal end of the grip/clutch lever 110. Thus, the grip/clutch lever 110 is urged toward the rear stop position L1 with the spring force of the return spring 116.

Located in an area between the left boss portion 84 of the left handle 82 and the connecting pipe 86 is a dog-legged arm 117 which is mounted with a mounting pin 118 for tilting movement. The arm 117 has an upper distal end 117a formed with an elongated slot 117b for fitting the connecting pin 114 and a lower distal end 117c formed with a bore 117d to which a rear distal end 36b of the clutch cable 36 is fixedly secured.

FIG. 13 shows a condition where the connecting pipe 86 is connected to the respective rear distal ends 82a, 83a of the right and left handles 82, 83 and the hold lever 90, the brake lever 100 and the grip/clutch lever 110 are mounted to the right and left boss portions 84, 85 with the right and left retainer bolts 87, 88 for swinging movement.

The grip/clutch lever 110 is composed of a member which is tiltable between the stop position (the rearward position) L1 and the operating position (the forward position) L2.

The connecting pin 114 protrudes from the cable arm 112 of the grip/clutch lever 110 and is inserted through the elongated slot 117b of the arm 117. With such an arrangement, tilting the grip/clutch lever 110 from the stop position (the rearward position) L1 to the operating position (the forward position) L2 causes the arm 117 to rotate counterclockwise about the shaft of the mounting pin 118 to enable the clutch cable 36 to be pulled rearward.

The brake lever 100 is composed of a member which is swingable between the brake position L3 and the operating position L5. Swinging the brake lever 100 from the brake position L3 to the forward brake-releasing position L4 causes the brake lever 100 to be brought into abutting contact with the grip/clutch lever 110. In such a position, the brake for the cutter is brought into the released condition while keeping the clutch for the cutter in the coupled condition.

The left mounting plate 102 of the brake lever 100 is formed with the protruding end 102b, which has a bore 102c to which a rear distal end 66a of a brake cable 66 is secured. With such an arrangement, swinging the brake lever 100 from the brake position L3 to the operating position L5 causes the brake cable 66 to be pulled rearward.

The hold lever 90 is composed of a member which is tilting between the stationary position L6 and the gripping position L7. The hold lever 90 serves as a member which retains the grip/clutch lever 110 at the operating position (forward position) L2. Also, an example of using the hold lever 90 is described below.

FIGS. 14A to 14C are views for illustrating the basic sequence of operations of the respective stoppers and the levers of the walk behind working machine of the second preferred embodiment.

In FIG. 14A, when the grip/clutch lever 110 remains at the stop position (rearward position) L1, the resting stopper segment 115a of the stopper arm 115 is held in the abutting contact with the right handle 83, thereby retaining the grip/clutch lever 110 at the stop position (rearward position) L1. Then, shifting the grip/clutch lever 110 from the stop position L1 to the operating position (forward position) L2, which is shown by a dotted line, causes the operating stopper segment 115b of the stopper arm 115 to be brought into abutting contact with the right handle 83 for retaining the grip/clutch lever 110 at the operating position (forward position) L2.

The grip/clutch lever 110 is comprised of the proximal end (lower end portion) provided with the resting stopper segment 115a and the operating stopper segment 115b for restricting the fore and aft movements of the grip/clutch lever 110. Consequently, during operation of the grip/clutch lever 110, it is possible for the operator's hand from interfering with the resting stopper segment 115a and the operating stopper segment 115b, with a resultant highly improved operability of the grip/clutch lever 110.

In FIG. 14B, when the brake lever 100 remains at the rearward, brake position L3, the stopper segment 103b of the right mounting plate 103 is held in abutting contact with the right handle 83, thereby retaining the brake lever 100 at the brake position L33. Then, shifting the brake lever 100 from the brake position L3 to the forward, operating position L5, whish is shown by a dotted line, causes the brake lever 100 to be brought into abutting contact with the grip/clutch lever 110. Since, in this instance, the grip/clutch lever 110 is retained at the operating position L2, the brake lever 100 is retained at the operating position L5.

In FIG. 14C, when the hold lever 90 remains at the stationary position L6, the resting stopper segment 94a of the stopper arm 94 is held in abutting contact with the right handle 83, thereby retaining the hold lever 90 at the stationary position L6. The, shifting the hold lever 90 from the stationary position L6 to the rearward, gripping position L7 as shown by a dotted line, the gripping stopper segment 94b of the stopper arm 94 is brought into abutting contact with the right handle 83, thereby retaining the hold lever 90 at the gripping position L7.

The hold lever 90 is comprised of the proximal end (lower end portion) provided with the resting stopper segment 94a and the gripping stopper segment 94b for restricting the fore and aft movements of the hold lever 90. Consequently, since the resting stopper segment 94a and the gripping stopper segment 94b are enabled to be separated from the gripping portion 91a of the hold lever 90, it is possible for the operator's hand 120 from interfering with the resting stopper segment 94a and the gripping stopper segment 94b during the operation of the hold lever 90. This results in a highly improved operability of the hold lever 90.

Figure 15:
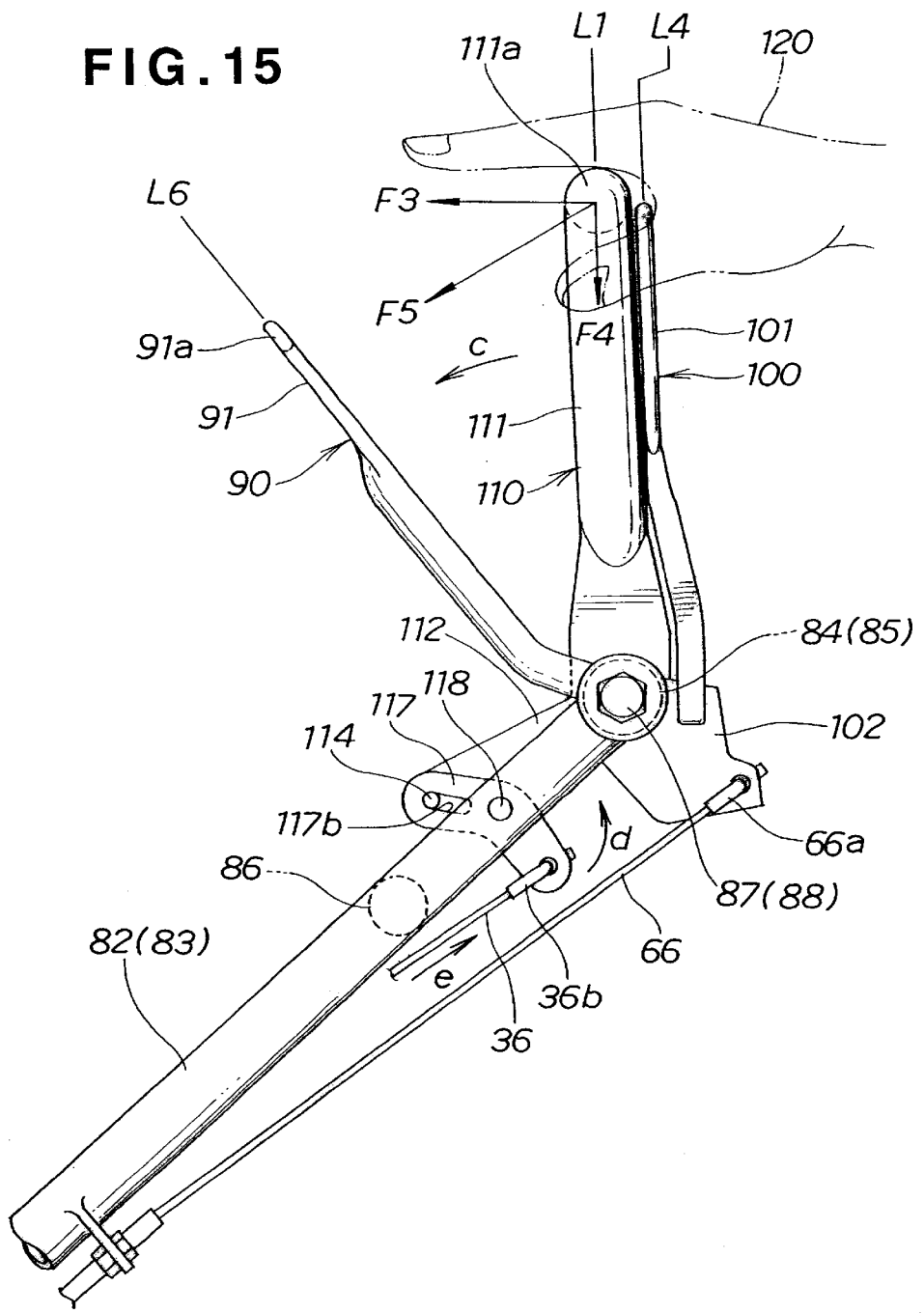
FIG. 15 is an operational view illustrating a condition wherein the grip/clutch lever is tilted with the brake lever from the state shown in FIG. 13 to the brake-releasing position.
Figure 16:
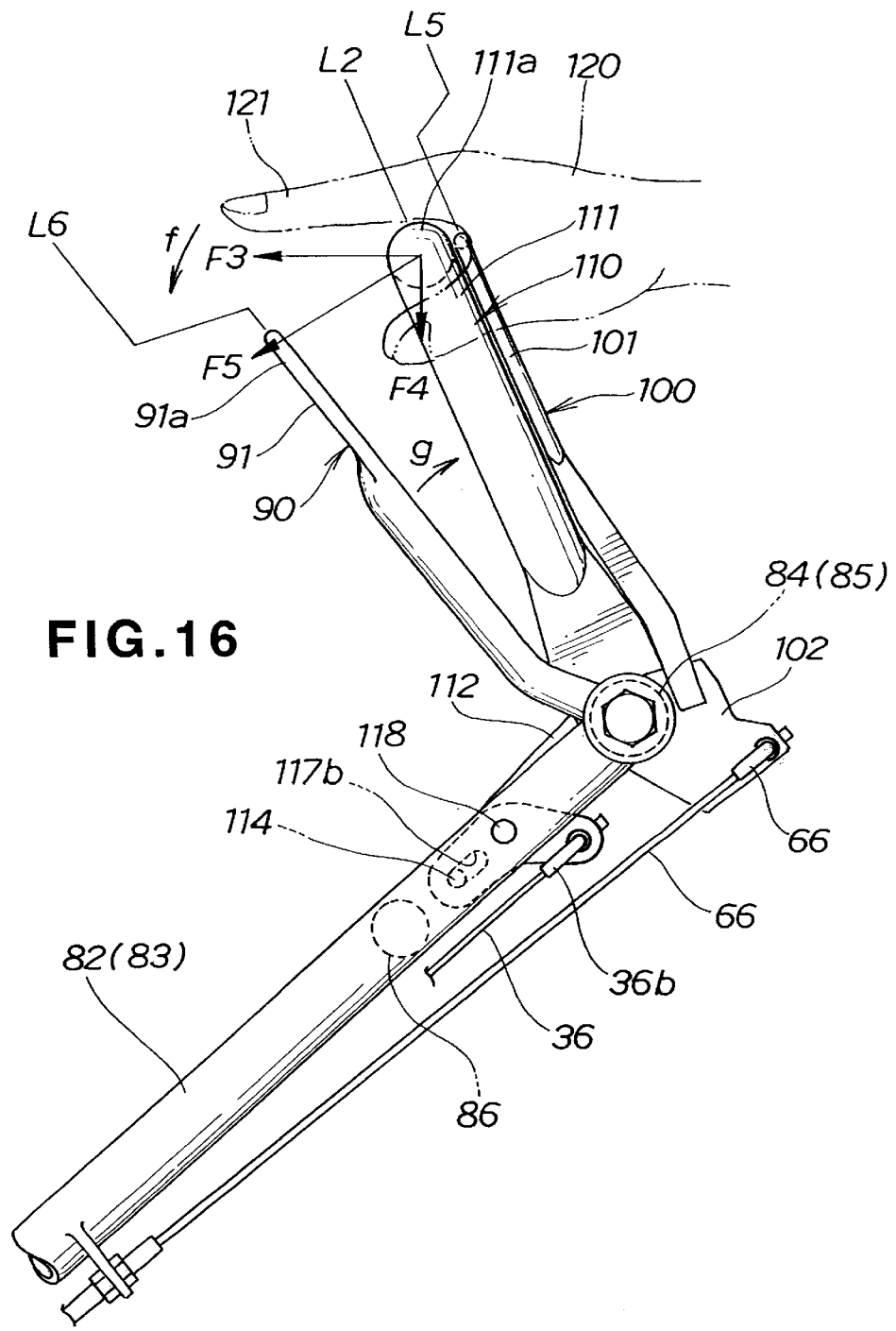
FIG. 16 is an operational view illustrating a condition wherein the grip/clutch lever is tilted with the brake lever from the state of FIG. 15 to the operating position.
Figure 17:
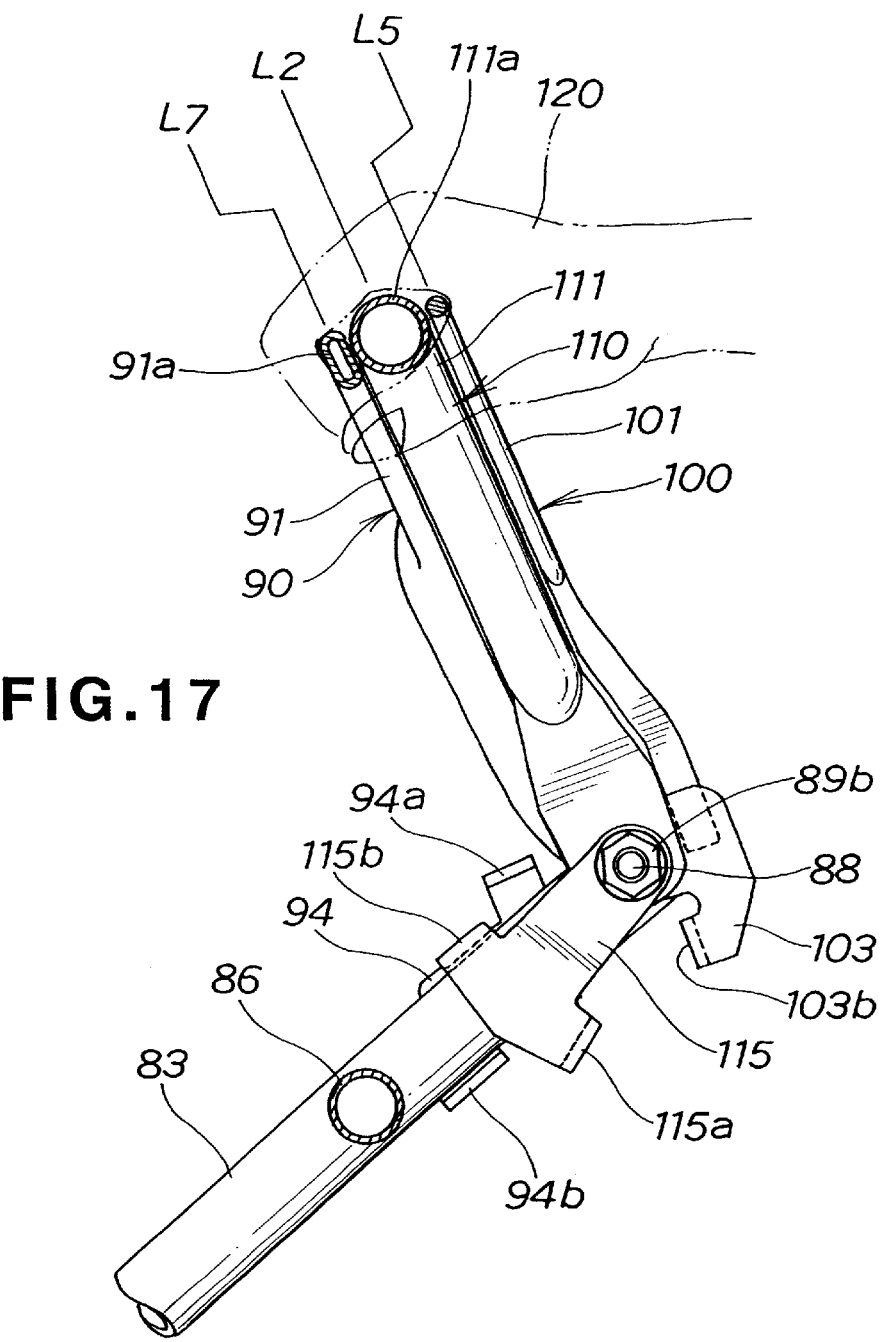
FIG. 17 is an operational view illustrating a condition wherein three levers including the brake lever, the grip/clutch lever and the hold lever are gripped with a hand from the condition shown in FIG. 16.

Now, the operations of the brake lever 100, the grip/clutch lever 110 and the hold lever 90 are described in conjunction with FIGS. 15 to 17.

First, in FIG. 13, the operator's hand is placed on the brake lever 100 and the brake lever 100 is shifted in the swinging movement from the brake position L3, which is an operative braking position, in a direction as shown by an arrow a about the axes of the right and left retainer bolts 87, 88. With such a shifting movement, eh brake cable 66 is pulled in a direction as shown by an arrow b with the protruding end 102b of the left mounting plate 102.

In FIG. 15, the brake lever 100 is swung to the brake-releasing position L4 until it abuts against the grip/clutch lever 100. Swinging the brake lever 100 to the brake-releasing position L4 causes the brake for the cutter 16 (shown in FIG. 1) to be released while keeping the clutch for the cutter 16 in the coupled state to rotate the cutter 16.

Further, the operator7s hand 120 applies the pushing force F3 onto the grip portion 111a of the grip/clutch lever 110 in the horizontal direction. When this takes place, the own weight F4 of the hand 120 is applied to the grip/clutch lever 110. This causes the composite force F5, that is, the pushing force F3 combined with the own weight F4, is applied in a direction as shown by an arrow. This composite force F5 is substantially aligned in an orientation wherein the grip/clutch lever 110 is tilted about the centers of the right and left retainer bolts 87, 88 of the grip/clutch lever 110. Consequently, applying the pushing force F3 to the grip/clutch lever 110 from the operator enables the grip/clutch lever 110 to be efficiently tilted about the centers of the right and left retainer bolts 87, 88 from the stop position L1 in a direction as shown by an arrow c. During such a tilting movement, the brake lever 100, which remains at the brake-releasing position L4, is tilted about the centers of the right and left retainer bolts 87, 88 together with the grip/clutch lever 110 in a direction as shown by the arrow c.

Tilting the grip/clutch lever 110 in the direction as shown by the arrow c causes the arm 117 to pivot about the axis of the mounting pin 118 in a direction as shown by an arrow d, thereby pulling the clutch cable 36 in a direction as shown by an arrow e. With such a movement, the clutch cable 36 shown in FIG. 2 is pulled in the direction as shown by the arrow, causing the clutch lever 35 to pivot in the surface direction of FIG. 2 such that the clutch shifter 32 is shifted in a direction as shown by an arrow in FIG. 3 via the clutch cam 33.

Then, if the grip/clutch lever 110 is tilted to a given position, the cone surface 37a of the clutch shifter 32 shown in FIG. 3 is brought into contact with he lining 38 to cause the running clutch 30 to be brought into the slipping state. Therefore, the walk behind lawnmower 10 is initiated to start moving in the forward direction at the low speed.

During such a movement, the presence of the pushing force F3 applied to the grip/clutch lever 110 and the brake lever 100 in the forward direction with the operator's hand 80 for pushing the walk behind lawnmower in the horizontal direction, i.e. in the forward direction enables the operator to operate the walk behind lawnmower in the natural motion. Thus, like in the first preferred embodiment, the walk behind lawnmower is enabled to start off in the smooth manner, thereby allowing the same to cut the grass in a high quality finish.

Further, rendering the running clutch 30 to remain in the slipping phase in the course of the forward movement of the grip/clutch lever 110 enables the operator to follow the taking-off movement of the walk behind lawnmower in the natural motion during the taking-off operation thereof. As a result, like in the first preferred embodiment, it is possible for the walk behind lawnmower to be simply operated.

In FIG. 16, the grip/clutch lever 110 is tilted to the operating position L2 and the brake lever 100 is tilted together with the grip/clutch lever 110 to the operating position L5. Swinging the grip/clutch lever 110 to the operating position L2 causes the cone surface 37a of the clutch shifter 32 to be surely brought into contact with the lining 38 to allow the running clutch 30 to be brought into the engaged or connected state. Under such a condition, if the operator extends the finger 121 of the hand 120, the finger 121 reaches the gripping portion 91a of the hold lever 90. Under this circumstance, bending the finger 121 as shown by an arrow f enables the hand 120 to grip the gripping portion 91a of the hold lever 90. As a result, the hold lever 90 is enabled to swing rearward as shown by an arrow g.

Also, the presence of the gripping portion 91a, which is collapsed into the substantially elliptical shape in cross section, of the hold lever 90 enables the finger 121 to readily hook the hold lever 90. With such an arrangement, it is possible for the gripping portion 91a of the hold lever 90 to be gripped with the finger 120 in a further simplified manner.

In FIG. 17, gripping the gripping portion 91a of the hold lever 90 with the hand 120 to tile the hold lever 90 to the gripping position L7 causes the gripping stopper segment 94b to be brought into abutting contact with the right handle 83. As a consequence, the hold lever 90 is retained at the gripping position L7, thereby restricting a further rearward movement of the same. On the other hand, the presence of the operating stopper segment 115b of the grip/clutch lever 110 held in abutting contact with the right handle 83 restricts the grip/clutch lever 110 from being shifted forward from the operating position L2. Accordingly, gripping the hold lever 90 and the grip/clutch lever 110 together enables the grip/clutch lever 110 to be retained at the operating position (forward position) L2. When this occurs, since the brake lever 90 is also gripped with the hand 120, the brake lever 100 remains in the abutting engagement with the grip/clutch lever 110, enabling the brake lever 100 to be retained at the operating position L5.

Tilting the grip/clutch lever 110 to the operating position L2 causes the cone surface 37a of the clutch shifter 32 to be surely brought into contact with the lining 38 to render the running clutch 30 to remain in the connected state, allowing the walk behind lawnmower 10 shown in FIG. 1 to start off forward at a given speed. During such a movement, the brake for the cutter 16 (shown in FIG. 1) is released while the clutch for the cutter 16 remains coupled, with the cutter 16 remaining in a rotating condition. Thus, it is possible for the cuter 16 to cut the grass while allowing the walk behind lawnmower 10 to travel in the forward direction.

In accordance with the second preferred embodiment, by merely gripping the grip/clutch lever 110 together with the hold lever 90, since the grip/clutch lever 110 is enabled to be retained at the operating position (forward position) L2, it is possible to retain the grip/clutch lever 110 at the operating position L2 in a simple fashion. As a result, it is possible to further improve the operability of the walk behind lawnmower, with a resultant further improvement in a convenience for using the walk behind lawnmower.

On the other hand, like in the first preferred embodiment, there is a need where the operating position L2 is retained by continuously pushing the grip/clutch lever 110 in the forward direction without gripping the hold lever 90. In such a case, allowing the hold lever 90 not to be gripped enables the hold lever 90 to be retained at the stationary position L6 (see FIG. 16), thereby precluding the operator's hand 120 from interfering with the hold lever 90 during the forward, continuous pushing movement of the grip/clutch lever 110.

Thus, the presence of a structure wherein the hold lever 90 is arranged to be tiltable enables the operation of the grip/clutch lever 110 to be retained at the operating position L2 to be carried out in two methods.

That is, it is possible to carry out the above operation in a method for retaining the grip/clutch lever 110 at the operating position L2 by gripping the hold lever 90 and a method for retaining the grip/clutch lever 110 at the operating position L2 by pushing the same in the forward direction. Thus, since it is possible for a suitable operating method to be selected from the two kinds of operating methods depending on working conditions of the walk behind lawnmower, the walk behind lawnmower may have a further improved operability, with a resultant further improvement in the convenience for using the same.

Now, a description is made on how to steer or to move the walk behind lawnmower 10 rearward. Gripping the grip/clutch lever 110 while gripping the hold lever 90 enables the grip/clutch lever 110 to be retained such that is not tilted in the fore and aft directions. As a result, under a condition where both the grip/clutch lever 110 and the hold lever 90 remain in the gripped states, it is possible to steer or to move the walk behind lawnmower 10 shown in FIG. 1. When steering or moving the walk behind lawnmower 10 rearward, of course, like in the first preferred embodiment, the running clutch may also be rendered uncoupled to enable free rotation of the rear wheels 13. In such a case, after releasing the gripping state of the hold lever 90, the grip/clutch lever 110 and the brake lever 100 may be pulled rearward such that they are tilted to the stop position L1 and the brake-releasing position L4 (shown in FIG. 15), respectively. When this occurs, the resting stopper segment 115a (see FIG. 14A) of the grip/clutch lever 110 is brought into abutting contact with the right handle 83 to restrict a further tilting movement of the grip/clutch lever 110. Under this condition, the running clutch 30 is rendered uncoupled to enable free rotation of the rear wheels 13. Consequently, the operator may steer or move the walk behind lawnmower rearward while keeping the grip/clutch lever 110 and the brake lever 100 in the gripped states.

Further, like in the first preferred embodiment, the grip/clutch lever 110 is so constructed as to commonly serve as the grip for the right and left handles 82, 83 in a combined use. Thus, it is possible for saving a labor to manipulate the clutch lever while gripping the grip of the handles that would be required in the conventional working machine. This results in a simplified operation with an decrease in the operator's load.

Now, a structure related with levers and handles of a walk behind lawnmower of a third preferred embodiment is described with reference to FIG. 18.

In the third preferred embodiment, the walk behind lawnmower 130 includes right and left hold levers 131, 135 in place of the holding lever 90 (shown in FIG. 11) of the second preferred embodiment, with other component parts being identical with those of the second preferred embodiment and bearing the same reference numerals as those of the second preferred embodiment for omitting the description of the same.

Figure 18:
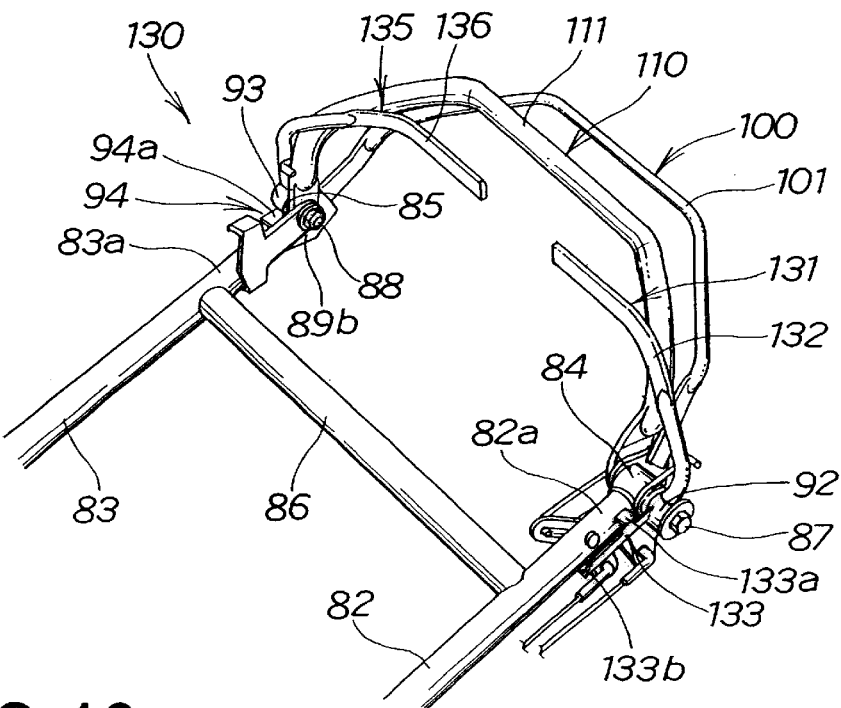
FIG. 18 is a perspective view illustrating handles and respective levers, etc., of a walk behind working machine according to a third embodiment of the present invention.

In FIG. 18, the left hold lever (hold lever) 131 is composed of a left dog-leg shaped gripping pipe 132, with its distal end mounted with a left boss portion 92 to which a stopper arm 133 is fixed. The left gripping pipe 132 is composed of a member having a distal end formed in a substantially elliptical shape in cross section and a proximal end portion formed in a circular shape in cross section.

The left boss portion 92 of the left hold lever 131 is located outside the left boss portion 84 fixed to the left handle 82, with the left retainer bolt 87 being fitted to both the left boss portions 92, 84. Thus, the left hold lever 131 is mounted to the rear distal end of the left handle 82 for swinging movement.

The stopper arm 133 is composed of a plate which protrudes forward from the left boss portion 92 of the left hold lever 131 and which has an upper central area formed with a resting stopper segment 133a for retaining the left hold lever 131 at the forward stationary position L6 (see FIG. 13) and a lower distal end formed with a gripping stopper segment 133b for retaining the left hold lever 131 at the rearward gripping position L7 (see FIG. 13). The stopper arm 133 is composed of a member formed in a symmetric relation with respect to the right and left of the stopper arm 94 of the second preferred embodiment.

The right hold lever (hold lever) 135 is composed of a left dog-leg shaped gripping pipe 136, with its distal end mounted with a right boss portion 93 to which a stopper arm 134 (which is identical with that of the second preferred embodiment) is fixed. The right gripping pipe 136 is composed of a member having a distal end formed in a substantially elliptical shape in cross section and a proximal end portion formed in a circular shape in cross section. The right boss portion 93 of the right hold lever 135 is located outside the right boss portion 85 fixed to the right handle 83, with the right retainer bolt 88 being fitted to both the right boss portions 93, 85. Thus, the right hold lever 135 is mounted to the rear distal end of the right handle 83 for swinging movement.

The stopper arm 94 is composed of the plate which protrudes forward from the right boss portion 93 of the right hold lever 135 and which has the upper central area formed with the resting stopper segment 94a for retaining the right hold lever 135 at the forward stationary position L6 (see FIG. 13) and the lower distal end formed with the gripping stopper segment 94b (see FIG. 14B) for retaining the right hold lever 135 at the rearward gripping position L7 (see FIG. 13).

In accordance with the third preferred embodiment, when tilting the grip/clutch lever 110 to the operating position L2 shown in FIG. 16 while shifting the brake lever 100 to the operating position L5, like in the second preferred embodiment, the right and left hold levers 131, 135 may be gripped together with the grip/clutch lever 110 and the brake lever 100, or either one of the right and left hold levers 131, 135 may be gripped. Thus, like in the second preferred embodiment, it is possible to retain the grip/clutch lever 110 at the operating position L2 shown in FIG. 17. As a result, it is possible in the third preferred embodiment to have the same advantages as those obtained in the second preferred embodiment.

Further, in accordance with the third embodiment, forming the hold lever of the second preferred embodiment into two separate pieces, i.e. the right and left hold levers 131, 135 enables the hold levers 131, 135 to be formed in a compact shape. For this reason, it is easy to handle and an assembling work can be performed in a simplified manner.

Figure 19:
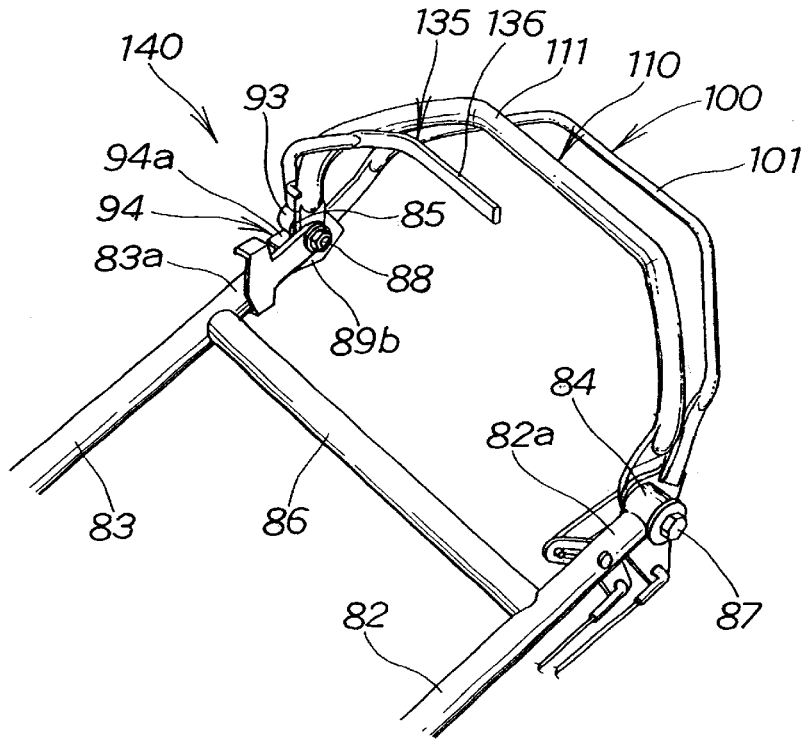
FIG. 19 is a perspective view illustrating handles and respective levers, etc., of a walk behind working machine according to a fourth embodiment of the present invention.

Now, a structure related with levers and handles of a walk behind lawnmower of a fourth preferred embodiment is described with reference to FIG. 19.

The walk behind lawnmower 140 includes only the right hold lever 135 among the right and left hold levers 131, 135 of the third preferred embodiment shown in FIG. 18, with the other component parts being identical with those of the third preferred embodiment and bearing the same reference numerals as those of the same to omit a description of the same.

In accordance with the fourth preferred embodiment, when tilting the grip/clutch lever 110 from the stop position L1 shown in FIG. 15 to the operating position L2 shown in FIG. 16 while shifting the brake lever 100 to the operating position L5, the right hold lever 135 may be gripped together with the grip/clutch lever 110 and the brake lever 100. Thus, like in the second preferred embodiment, it is possible to retain the grip/clutch lever 110 at the operating position L2 shown in FIG. 16. As a result, it is possible in the fourth preferred embodiment to have the same advantages as those obtained in the second preferred embodiment.

Further, in accordance with the fourth embodiment, the right hold lever 135 may have a simplified shape, making it possible to reduce the cost of the right hold lever 135. In addition, according to the fourth preferred embodiment, since the right hold lever 135 may be formed in a compact structure, it is easy to handle and an assembling work can be performed in a simplified manner.

Now, a structure related with levers and handles of a walk behind lawnmower of a fifth preferred embodiment is described with reference to FIGS. 20 and 21.

In the second preferred embodiment described in conjunction with FIGS. 15 to 17, although it is constructed such that the running clutch 30, shown in FIGS. 2 and 3, is brought into the slipping state in the course of tilting movement of the grip/clutch lever 110 from the stop position L1 to the operating position L2 and is operative to be brought into the connected state when the grip/clutch lever 110 reaches the operating position L2, the fifth preferred embodiment is so arranged such that the running clutch 30 is maintained in the slipping state under a condition where the grip/clutch lever 110 remains stationary in the operating position L2.

When tilting the grip/clutch lever 110 from the stop position L1 in the second preferred embodiment shown in FIG. 2 to the operating position L2, the brake lever 100 is tilted together with the grip/clutch lever 110 to the operating position L5.

Figure 20:
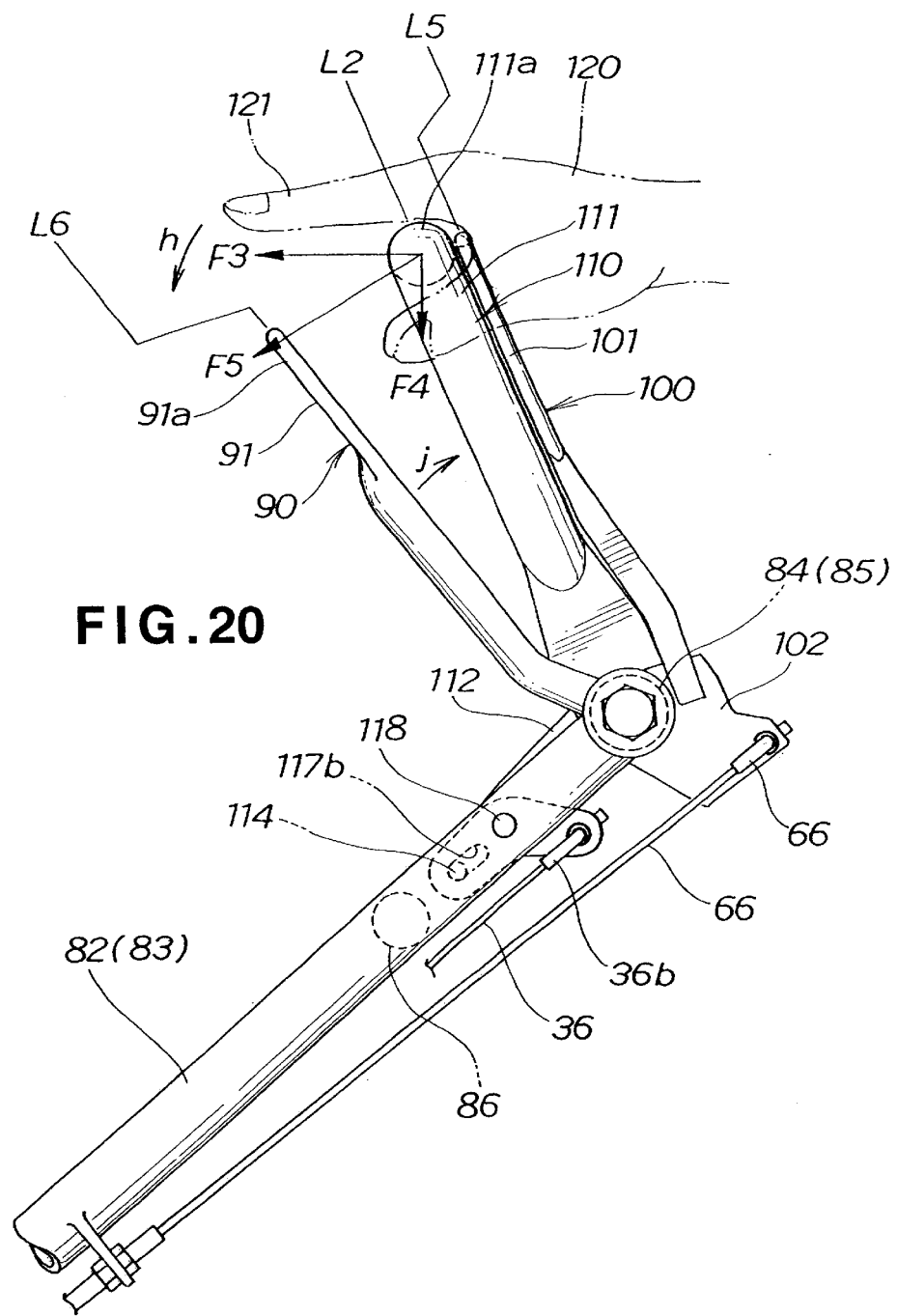
FIG. 20 is a perspective view illustrating handles and respective levers, etc., of a walk behind working machine according to a fifth embodiment of the present invention.

As seen in FIG. 20, when the grip/clutch lever 110 is tilted to the operating position L2, the cone surface 37a of the clutch shifter 32 is brought into contact with the lining 38 such that the running clutch 30 is brought into the slipping state. Therefore, the walk behind lawnmower 10 shown in FIG. 1 is enabled to start off forward at the low speed.

Upon operation of the cone surface 37a of the clutch shifter 32 into contact with the lining 38, the grip/clutch lever 110 is rendered stationary at the operating position L2. In this event, the operating stopper segment 115b (see FIG. 21) of the grip/clutch lever 110 is held out of abutting engagement with the right handle 83.

Now, under a condition where the grip/clutch lever 110 is tilted to the operating position L2, since the operator applies the pushing force F3 to the grip/clutch lever 110 and the brake lever 100 with the hand 120 in the forward direction, i.e. in the horizontal, namely, in the forward traveling direction of the walk behind lawnmower, the operator is enabled to operate the walk behind lawnmower in the natural motion. Accordingly, like in the first and second preferred embodiments, it is possible for the walk behind lawnmower to start off in a smooth fashion to cut the grass in a high quality finish.

Further, rendering the running clutch 30 operative to remain in the slipping state when the grip/clutch lever 110 is tilted to the operating position L2 enables the operator to follow the taking-off movement of the walk behind lawnmower in the natural motion during taking-off operation of the walk behind lawnmower. As a result, like in the first and second preferred embodiments, it is possible to operate the walk behind lawnmower in a simple fashion. Under such a circumstance, the operator may extend the finger 121 of the hand 120 such that the finger 121 reaches the gripping portion 91a of the hold lever 90. From this condition, when bending the finger 121 as shown by an arrow h, the hand 120 is enabled to grip the grip portion 91a of the hold lever 90. Thus, it is possible to tilt the hold lever 90 in a rearward direction as shown by an arrow j.

Also, forming the grip portion 91a of the hold lever 90 in a shape to have the substantially elliptical in cross section enables to provide an ease for the hand 120 to grip the grip portion 91a of the hold lever 90.

In FIG. 21, gripping the gripping hand 91a of the hold lever 90 with the hand 120 to tile the hold lever to the gripping position L7 causes the gripping stopper segment 94b to be brought into abutting contact with the right handle 83. Consequently, the hold lever 90 is retained at the gripping position L7 for restricting a further tilting movement in the rearward direction. When this occurs, since the cone surface 37a of the clutch shifter 32 shown in FIG. 3 is held in contact with the lining 38, the grip/clutch lever 110 is enabled to be rendered stationary at the operating position L2 in a continuous fashion. Thus, the running clutch 30 shown in FIG. 3 remains in the slipping state.

Gripping the hold lever 90 and the grip/clutch lever 110 together enables the grip/clutch lever 110 to be rendered stationary at the operating position L2 (,i.e. in the forward position). Under this circumstance, a given distance S is left between the grip/clutch lever 110 and the hold lever 90. In this instance, since the brake lever 100 is gripped with the hand 120, the brake lever 100 is continuously held in an abutting contact with the grip/clutch lever 110, thereby enabling the brake lever 100 to be retained in the operating position L5. Thus, it is possible to cut the grass with the cutter 16 (see FIG. 1) while permitting the walk behind lawnmower to travel with the rear wheels 13 with the running clutch 30 remaining in the slipping state.

In such a manner, the walk behind lawnmower of the fifth preferred embodiment may have the same advantages as those of the first and second preferred embodiments.

Also, the running clutch 30 shown in FIGS. 2 and 3 are constructed such that the surface 37a of the cone 37 and the lining 38 of the hub 39 resist the slipping condition in a long period of time to enable cutting operation of the grass while maintaining the running clutch 30 in the slipping phase.

In addition, in accordance with the fifth preferred embodiment, since there is the given distance S maintained between the grip/clutch lever 110 and the hold lever 90, adjusting (in strength and weakness) the gripping force for the grip/clutch lever 110 and the hold lever 90 enables the traveling speed of the walk behind lawnmower to be easily adjusted for thereby providing a further improved operability. More particularly, it is desired for the waking type lawnmower to be driven with an increased drive power during ascending a slope and to be moved at a higher speed during traveling in a non-working condition. Accordingly, strongly gripping the grip/clutch lever 110 and the hold lever 90 and strongly pushing the grip/clutch lever 110 toward the hold lever 90 enables the cone surface 37a of the clutch shifter 32 shown in FIG. 3 to be strongly brought into pressured contact with the lining 38. With such an arrangement, adjusting the running clutch 30 into the slipping phase with less slippage to cause the drive power of the engine 14 to be efficiently delivered to the rear wheels 13 allows the walk behind lawnmower to travel at a higher speed.

Also, when the walk behind lawnmower ascends the sloped hill, the walk behind lawnmower is applied with a force compelling the same to descend the slope with its own weight. When this takes place, strongly pushing the grip/clutch lever 110 in the forward direction instead of strongly gripping the grip/clutch lever 110 and the hold lever 90 enables the cone surface 37a of the clutch shifter 32 to be strongly brought into pressured contact with the lining 38. With such a movement, like in a case where the grip/clutch lever 110 and the hold lever 90 are strongly gripped, the running clutch 30 is adjusted into the slipping state with less slippage such that the drive power of the engine 14 can be more efficiently delivered to the rear wheels 13.

Figure 22:
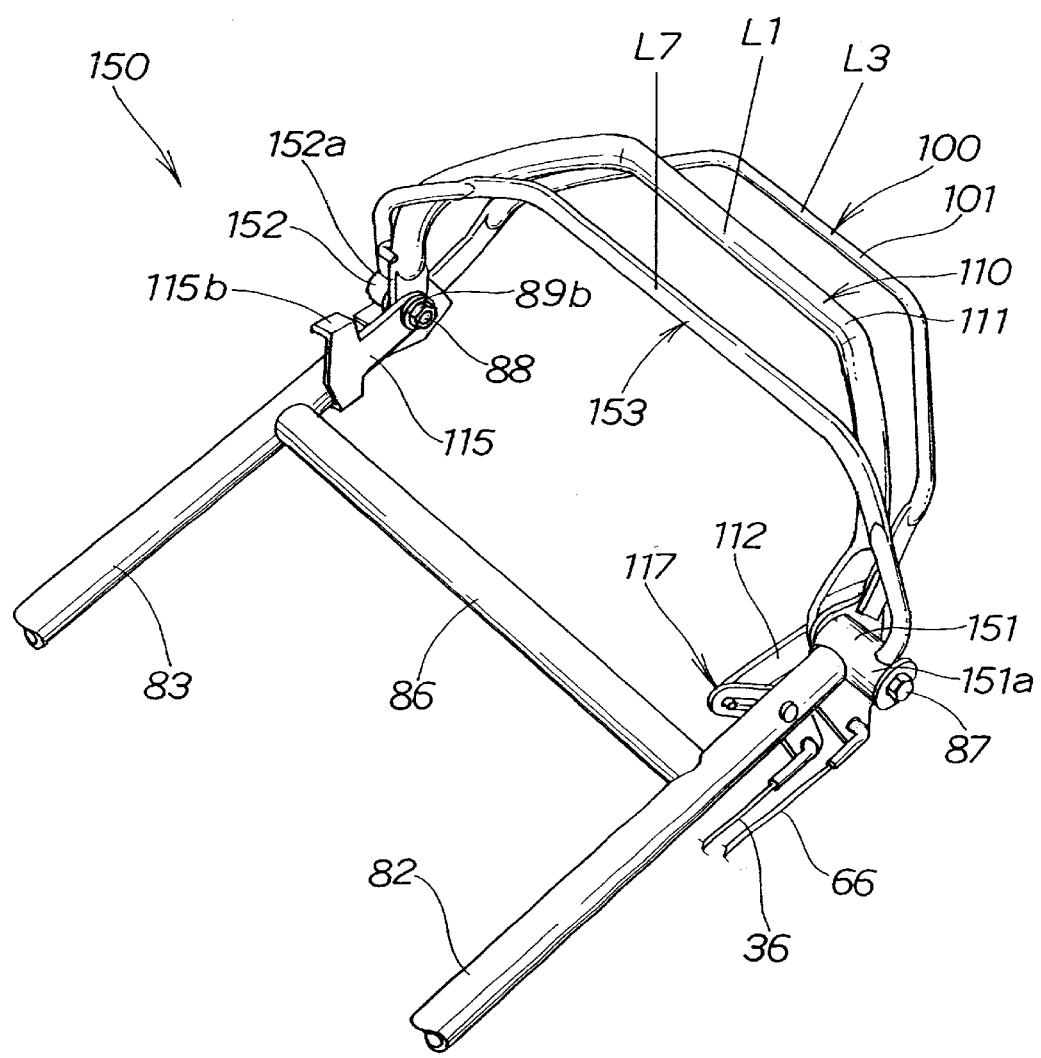
FIG. 22 is a perspective view illustrating handles and respective levers, etc., of a walk behind working machine according to a sixth embodiment of the present invention.

Lastly, a structure related with levers and handles of a walk behind lawnmower of a sixth preferred embodiment is described with reference to FIG. 22. The walk behind lawnmower 150 of the sixth preferred embodiment shown in FIG. 22 has a feature wherein a hold lever 153 is fixed at the gripping position L7 (see FIG. 13), with other features bearing the same structure as that of the fifth preferred embodiment shown in FIGS. 20 and 21.

The walk behind lawnmower 150 of the sixth preferred embodiment is composed of the right and left handles 82, 83, whose rear distal ends are mounted with right and left boss portions 151, 152 which include outwardly extending protruding segments 151a, 152a, respectively, to which right and left distal ends of the hold lever 153 are welded to fix the hold lever 153 at the gripping position L7.

The hold lever 153 has a gripping portion which is formed in the same substantially U-shaped configuration as the gripping pipe 91 (which forms a component part of the hold lever 90) of the fifth preferred embodiment.

In accordance with the sixth preferred embodiment, when tilting the grip/clutch lever 110 to the operating position L2 shown in FIG. 20 while shifting the brake lever 100 to the operating position L5, it is possible for the grip/clutch lever 110 to rest at the position distanced from the hold lever 151 by the given space S like in the fifth preferred embodiment shown in FIG. 21. Under this condition, gripping the hold lever 153 together with the grip/clutch lever 110 and the brake lever 100 enables the running clutch 30 shown in FIG. 3 to be maintained in the slipping state as in the fifth preferred embodiment. As a result, in accordance with the preferred embodiment, adjusting (in strength and weakness) the gripping force for the grip/clutch lever 110 and the hold lever 153 like in the fifth preferred embodiment enables the working speed of the walk behind lawnmower 10 (see FIG. 1) to be finely adjusted in an easy manner, with a resultant improvement in the operability.

Further, in accordance with the sixth preferred embodiment, fixing the hold lever 153 makes the machine simplified in structure.

In the illustrated preferred embodiments described above, although walk behind working machine of the present invention has been exemplarily discussed in conjunction with the lawnmowers 10, 80, 130, 140, 150, the working machine of the present invention may be applied to other types of working machineries.

Also, in the above preferred embodiments, although the running clutch 30 has been discussed with reference to an example wherein the cone type clutch is employed, other types of clutches may also be employed. As a main point, the clutch may be of any type which is operable to be brought into the slipping state.

The present disclosure relates to the subject matters of Japanese Patent Application No. 2000-403381, filed Dec. 28, 2000, and Japanese Patent Application No. 2001-223318, filed Jul. 24, 2001, the disclosures of which are expressly incorporated herein by reference in their entireties.

What is claimed is:

1. A walk behind working machine comprising:
   a machine body having a forward end portion and a rear end portion;
   a drive source mounted on the machine body;
   a pair of drive wheels mounted on the rear end portion of the machine body and driven by the drive source;
   a running clutch disposed between the drive wheels and connected to the drive source so that the running clutch can operate in a slipping phase;
   a cutter mounted on the machine body to undergo rotation;
   a pair of operating handles extending from the rear end portion of the machine body;
   a single grip/clutch lever serving both as a grip handle for gripping by an operator to maneuver the working machine and as a clutch lever manually operable to operate the running clutch between a coupled state and an uncoupled state, the grip/clutch lever being pivotally mounted on distal end portions of the operating handles to undergo pivotal movement in forward and rearward directions of the machine body between a rearward stop position in which the grip/clutch lever is normally disposed and has a forward tilt and a forward operating position in which the grip/clutch lever has a forward tilt greater than the forward tilt in the rearward stop position;
   a clutch cable for connecting the grip/clutch lever to the running clutch so that the running clutch is in the coupled state when the grip/clutch lever is pivoted to the forward operating position and in the uncoupled state when the grip/clutch lever is pivoted to the rearward stop position;
   a brake lever pivotally mounted on the distal end portions of the operating handles to undergo pivotal movement between a first position in which the brake lever is normally disposed and a second position different from the first position, the grip/clutch lever being disposed closer to the forward end portion of the machine body than the brake lever when the grip/clutch lever is in the rearward stop position and the brake lever in the first position; and
   a brake cable for connecting the brake lever to the cutter so that the cutter is in a braking condition and does not rotate when the brake lever is in the first position and so that the braking condition of the cutter is released to allow the cutter to rotate when the brake lever is pivoted to the second position;
   wherein pivotal movement of the grip/clutch lever from the rearward stop position toward the forward operating position causes the running clutch to operate in the slipping phase to thereby allow the working machine to start moving in a forward direction at a low speed; and
   wherein the forward tilt of the grip/clutch lever while being in the rearward stop position is determined such that when a forward push is applied by the operator to the grip/clutch lever while walking in the forward direction for causing the grip/clutch lever to pivot from the rearward stop position toward the forward operating position, a weight of the operator's hand acts to generate, together with the forward push by the operator, a composite force acting in the same direction as the direction of pivotal movement of the grip/clutch lever.

2. A walk behind working machine according to claim 1; wherein the grip/clutch lever has stoppers mounted to a proximal end thereof for restricting pivotal movement of the grip/clutch lever in the forward and rearward directions beyond the forward operating position and the rearward stop position.

3. A walk behind working machine according to claim 1; wherein each of the brake lever and the grip/clutch lever comprises a generally U-shaped gripping member.

4. A walk behind working machine according to claim 1; further comprising a first biasing member for biasing the brake lever to a rearward braked position; and a second biasing member for biasing the grip/clutch lever to the rearward stop position.

5. A walk behind working machine according to claim 4; further comprising a tubular connecting member extending between and connected to the distal end portions of the operating handles, and a retaining member extending through the tubular connecting member and having opposite terminal end portions each extending from a respective one of a pair of terminal end portions of the tubular connecting member; and wherein each of the brake lever and the grip/clutch lever has a pair of mounting bores each for receiving a respective one of the terminal end portions of the retaining member.

6. A walk behind working machine according to claim 1; further comprising a tubular connecting member extending between and connected to the distal end portions of the operating handles, and a retaining member extending through the tubular connecting member and having opposite terminal end portions each extending from a respective one of a pair of terminal end portions of the tubular connecting member; and wherein the grip/clutch lever has a pair of mounting bores each for receiving a respective one of the terminal end portions of the retaining member.

7. A walk behind working machine comprising:
   a machine body having a forward end portion and a rear end portion;
   a drive source mounted on the machine body;
   a pair of drive wheels mounted on the rear end portion of the machine body and driven by the drive source;
   a running clutch disposed between the drive wheels and connected to the drive source so that the running clutch can operate in a slipping phase;
   a pair of operating handles extending from the rear end portion of the machine body;
   a single grip/clutch lever serving both as a grip handle for gripping by an operator to maneuver the working machine and as a clutch lever manually operable to operate the running clutch between a coupled state and an uncoupled state, the grip/clutch lever being pivotally mounted on distal end portions of the operating handles to undergo pivotal movement in forward and rearward directions of the machine body between a rearward stop position in which the grip/clutch lever is normally disposed and has a forward tilt and a forward operating position in which the grip/clutch lever has a forward tilt greater than the forward tilt in the rearward stop position;
   a clutch cable for connecting the grip/clutch lever to the running clutch so that the running clutch is in the coupled state when the grip/clutch lever is pivoted to the forward operating position and in the uncoupled state when the grip/clutch lever is pivoted to the rearward stop position;
   a brake lever pivotally mounted on distal end portions of the operating handles to undergo pivotal movement in the forward and rearward directions of the machine body;

a tubular connecting member extending between and connected to the distal end portions of the operating handles;

a retaining member extending through the tubular connecting member and having opposite terminal end portions each extending from a respective one of a pair of terminal end portions of the tubular connecting member, each of the brake lever and the grip/clutch lever having a pair of mounting bores each for receiving a respective one of the terminal end portions of the retaining member;

a first biasing member for biasing the brake lever to a rearward braked position, the first biasing member being mounted on one of the terminal end portions of the tubular connecting member; and a second biasing member for biasing the grip/clutch lever to the rearward stop position, the second biasing member being mounted on the other of the terminal end portions of the tubular connecting member;

wherein pivotal movement of the grip/clutch lever from the rearward stop position toward the forward operating position causes the running clutch to operate in the slipping phase to thereby allow the working machine to start moving in a forward direction at a low speed.

8. A walk behind working machine comprising:

a machine body having a forward end portion and a rear end portion;

a drive source mounted on the machine body;

a pair of drive wheels mounted on the rear end portion of the machine body and driven by the drive source;

a running clutch disposed between the drive wheels and connected to the drive source so that the running clutch can operate in a slipping phase;

a pair of operating handles extending from the rear end portion of the machine body;

a single grip/clutch lever serving both as a grip handle for gripping by an operator to maneuver the working machine and as a clutch lever manually operable to operate the running clutch between a coupled state and an uncoupled state, the grip/clutch lever being pivotally mounted on distal end portions of the operating handles to undergo pivotal movement in forward and rearward directions of the machine body between a rearward stop position in which the grip/clutch lever is normally disposed and has a forward tilt and a forward operating position in which the grip/clutch lever has a forward tilt greater than the forward tilt in the rearward stop position;

a clutch cable for connecting the grip/clutch lever to the running clutch so that the running clutch is in the coupled state when the grip/clutch lever is pivoted to the forward operating position and in the uncoupled state when the grip/clutch lever is pivoted to the rearward stop position;

a tubular connecting member extending between and connected to the distal end portions of the operating handles;

a retaining member extending through the tubular connecting member and having opposite terminal end portions each extending from a respective one of a pair of terminal end portions of the tubular connecting member, the grip/clutch lever having a pair of mounting bores each for receiving a respective one of the terminal end portions of the retaining member; and a biasing member mounted on one of the terminal end portions of the tubular connecting member for biasing the grip/clutch lever to the rearward stop position;

wherein pivotal movement of the grip/clutch lever from the rearward stop position toward the forward operating position causes the running clutch to operate in the slipping phase to thereby allow the working machine to start moving in a forward direction at a low speed.

9. A walk behind working machine comprising:

a frame having a forward end portion and a rear end portion;

a prime mover mounted on the frame;

a pair of drive wheels mounted on the frame for undergoing rotation;

a power transmission mechanism for transmitting rotational power from the prime mover to the drive wheels;

a running clutch operable in an engaged state in which rotational power is transmitted to the drive wheels and in a disengaged state in which rotational power is not transmitted to the drive wheels;

a cutter mounted on the frame to undergo rotation;

a pair of operating handles extending from the rear end portion of the frame;

a single grip/clutch lever serving both as a grip handle grippable by an operator to maneuver the working machine during movement thereof in a forward direction and as a clutch lever manually operable to selectively place the running clutch in the engaged state and the disengaged state, the grip/clutch lever being pivotally mounted on distal end portions of the operating handles to undergo pivotal movement in forward and rearward directions of the frame between a rearward stop position having a first forward tilt and in which the running clutch is in the disengaged state and a forward operating position having a second forward tilt greater than the first forward tilt and in which the running clutch is in the engaged state; and a brake lever pivotally mounted on the distal end portions of the operating handles to undergo pivotal movement between a first position in which the cutter is in a braking condition and does not rotate and a second position different from the first position and in which the braking condition of the cutter is released to allow rotation of the cutter, the grip/clutch lever being disposed closer to the forward end portion of the frame than the brake lever when the grip/clutch lever is in the rearward stop position and the brake lever in the first position;

wherein the first forward tilt of the grip/clutch lever is determined such that when a forward push is applied by the operator to the grip/clutch lever while walking in the forward direction for causing the grip/clutch lever to pivot from the rearward stop position toward the forward operating position, a weight of the operator's hand acts to generate, together with the forward push by the operator, a composite force acting in the same direction as the direction of pivotal movement of the grip/clutch lever.

10. A walk behind working machine according to claim 9; wherein the running clutch is disposed between the drive wheels.

11. A walk behind working machine according to claim 9; further comprising restricting means for restricting pivotal movement of the grip/clutch lever in the forward and rearward directions beyond the forward operating position and the rearward stop position.

12. A walk behind working machine according to claim 9; further comprising a clutch cable for connecting the grip/ clutch lever to the running clutch so that the running clutch is in the engaged state when the grip/clutch lever is in the forward operating position and in the disengaged state when the grip/clutch lever is in the rearward stop position.

13. A walk behind working machine according to claim 9; wherein the power transmission mechanism comprises an input shaft rotationally driven by the rotational power from the prime mover, a pinion connected to an end of the input shaft for rotation therewith, and a gear in meshing engagement with the pinion for rotation therewith.

14. A walk behind working machine according to claim 13; wherein the running clutch comprises a clutch shifter having a peripheral surface portion for contacting the gear of the power transmission mechanism; and wherein the clutch lever is manually operable to selectively place the clutch shifter in a full contacting state with the gear so that the drive wheels are rotated, in a non-contacting state with the gear so that the drive wheels are not rotated, and in a partial contacting state with the gear so that a slipping condition is maintained between the clutch shifter and the gear during which the drive wheels are rotated under a controlled state.

15. A walk behind working machine according to claim 9; further comprising stopping members mounted on a terminal end portion of the grip/clutch lever for restricting pivotal movement of the grip/clutch lever in the forward and rearward directions beyond the forward operating position and the rearward stop position.

16. A walk behind working machine according to claim 9; further comprising a tubular connecting member extending between and connected to the distal end portions of the operating handles, and a retaining member extending through the tubular connecting member and having opposite terminal end portions each extending from a respective one of a pair of terminal end portions of the tubular connecting member; and wherein the grip/clutch lever has a pair of mounting bores each for receiving a respective one of the terminal end portions of the retaining member.

17. A walk behind working machine comprising:
a frame having a forward end portion and a rear end portion;
a prime mover mounted on the frame;
a pair of drive wheels mounted on the frame for undergoing rotation;
a power transmission mechanism for transmitting rotational power from the prime mover to the drive wheels;
a running clutch operable in an engaged state for transmitting rotational power to the drive wheels and in a disengaged state for not transmitting rotational power to the drive wheels;
a pair of operating handles extending from the rear end portion of the frame;
a single grip/clutch lever serving both as a grip handle grippable by an operator to maneuver the working machine and as a clutch lever manually operable to selectively place the running clutch in the engaged state and the disengaged state, the grip/clutch lever being pivotally mounted on distal end portions of the operating handles to undergo pivotal movement in forward and rearward directions of the frame between a rearward stop position having a first forward tilt and in which the running clutch is in the disengaged state and a forward operating position having a second forward tilt greater than the first forward tilt and in which the running clutch is in the engaged state;

a tubular connecting member extending between and connected to the distal end portions of the operating handles;

a retaining member extending through the tubular connecting member and having opposite terminal end portions each extending from a respective one of a pair of terminal end portions of the tubular connecting member, the grip/clutch lever having a pair of mounting bores each for receiving a respective one of the terminal end portions of the retaining member; and a biasing member mounted on one of the terminal end portions of the tubular connecting member for biasing the grip/clutch lever to the rearward stop position.

18. A walk behind working machine comprising:
a frame having a forward end portion and a rear end portion;
a prime mover mounted on the frame;
a pair of drive wheels mounted on the frame for undergoing rotation;
a power transmission mechanism for transmitting rotational power from the prime mover to the drive wheels;
a running clutch operable in an engaged state for transmitting rotational power to the drive wheels and in a disengaged state for not transmitting rotational power to the drive wheels;
a cutter mounted on the frame to undergo rotation;
a pair of operating handles extending from the rear end portion of the frame;
a grip/clutch lever manually operable to selectively place the running clutch in the engaged state and the disengaged state, the grip/clutch lever being pivotally mounted on the operating handles to undergo pivotal movement between a first position in which the running clutch is in the disengaged state and a second position different from the first position and in which the running clutch is in the engaged state; and
a brake lever pivotally mounted on the operating handles to undergo pivotal movement between a first position in which the cutter is in a braking condition and does not rotate and a second position different from the first position and in which the braking condition of the cutter is released to allow rotation of the cutter, the grip/clutch lever being disposed closer to the forward end portion of the frame than the brake lever when each of the grip/clutch lever and the brake lever is in the respective first position.

* * * * *